United States Patent [19]

Sugawara et al.

[11] Patent Number: 5,438,421
[45] Date of Patent: Aug. 1, 1995

[54] ORIENTATION FILM OF LIQUID CRYSTAL HAVING BILATERALLY ASYMMETRIC RIDGES SEPARATED BY GROOVES

[75] Inventors: Kiyomi Sugawara, Sendai; Yoshihiko Ishitaka, Miyagi; Hiroshi Yamagami, Nagaoka; Masahiko Yamaguchi, Sendai; Mitsuru Kano, Furukawa; Hiroyuki Hebiguchi, Sendai, all of Japan

[73] Assignee: Alps Electric Co., Ltd., Tokyo, Japan

[21] Appl. No.: 203,849

[22] Filed: Feb. 28, 1994

Related U.S. Application Data

[63] Continuation of Ser. No. 866,727, Apr. 10, 1992, abandoned.

[30] Foreign Application Priority Data

| Apr. 24, 1991 | [JP] | Japan | 3-122330 |
| Jul. 8, 1991 | [JP] | Japan | 3-167257 |
| Sep. 13, 1991 | [JP] | Japan | 3-235040 |
| Oct. 4, 1991 | [JP] | Japan | 3-258148 |

[51] Int. Cl.$^6$ ............................... G02F 1/1337
[52] U.S. Cl. ............................ 359/75; 359/76; 428/1
[58] Field of Search ............... 359/75, 76, 77, 78, 359/82, 62, 53; 428/1; 430/1, 2

[56] References Cited

U.S. PATENT DOCUMENTS

| 4,127,322 | 11/1978 | Jacobson et al. | 359/72 |
| 4,232,947 | 11/1980 | Funada et al. | 359/76 |
| 4,252,414 | 2/1981 | Kinugawa et al. | 359/75 |
| 4,256,377 | 3/1981 | Krueger et al. | 359/76 |
| 4,357,374 | 11/1982 | Ogawa | 359/76 |
| 4,370,194 | 1/1983 | Shaver et al. | 359/76 |
| 4,469,408 | 9/1984 | Krüger et al. | 359/75 |
| 4,521,080 | 6/1985 | Funada et al. | 359/78 |
| 4,702,945 | 10/1987 | Etzbach et al. | 428/1 |
| 4,850,680 | 7/1989 | Yamazaki et al. | 359/77 |
| 4,892,392 | 1/1990 | Broer | 359/75 |
| 4,948,708 | 8/1990 | Veenvliet et al. | 430/316 |
| 5,067,797 | 11/1991 | Yokokura et al. | 359/76 |
| 5,073,294 | 12/1991 | Shannon et al. | 359/76 |
| 5,155,610 | 10/1992 | Hikmet et al. | 359/77 |
| 5,262,882 | 11/1993 | Hikmet | 359/76 |

FOREIGN PATENT DOCUMENTS

| 0192926 | 11/1986 | Japan . |
| 0136024 | 6/1988 | Japan . |
| 0214721 | 9/1988 | Japan . |
| 0137237 | 5/1989 | Japan . |
| 0145628 | 6/1989 | Japan . |
| 4009007 | 1/1992 | Japan . |

*Primary Examiner*—William L. Sikes
*Assistant Examiner*—Kenneth Parker
*Attorney, Agent, or Firm*—Guy W. Shoup; Patrick T. Bever

[57] ABSTRACT

An orientation film for a liquid crystal display. The film is formed on a substrate and has a first irregular form repeated in a first direction and a second irregular form repeated in a second direction, which is perpendicular to the first direction. The second irregular form has a longer pitch than the pitch of the first irregular form. The profile of the second irregular form in any plane perpendicular to the first direction has a portion inclined with respect to the substrate. The pretilt angle of the orientation film is high. The patterns may be irregular and asymmetric, which may be ridges separated by a continuous groove. The orientation may be formed by using a first mold having one of the patterns, and a second mold with a second pattern, or first and second holographic exposed layers. The orientation layer may be a liquid crystal polymer which is formed by using a heated stamper to form a pattern in a high polymer liquid crystal while applying a voltage.

8 Claims, 14 Drawing Sheets

SECOND DIRECTION

FIRST DIRECTION ← → SECOND DIRECTION

HOLOGRAPHIC EXPOSURE

DEVELOPMENT

ION-BEAM ETCHING

FILM OF PHOTOSENSITIVE RESIN

COATING OF ORIENTATION FILM

DIRECTION OF MAGNETIC FIELD

DIRECTION OF ELECTRIC DIPOLE MOMENT

ORIENTATION FILM OF LIQUID CRYSTAL HAVING BILATERALLY ASYMMETRIC RIDGES SEPARATED BY GROOVES

This application is a continuation of application Ser. No. 07/866,727, filed Apr. 10, 1992, now abandoned.

BACKGROUND OF THE INVENTION i) Field of the Invention

The present invention relates to an orientation film used to orient liquid crystal molecules into a predetermined direction.

The present invention also relates to a liquid crystal device (abbreviated as LCD hereinafter). More specifically, the present invention relates to a liquid crystal device requiring color adjustment.

The present invention further relates to a liquid crystal device and a method for producing the same. More specifically, the present invention relates to a liquid crystal device wherein the direction of the optical axis of a substrate with a film optically anisotropic to the orientation axis of a displaying liquid crystal device can be adjusted in an easier and more accurate manner. The present invention furthermore relates to a method for producing a film with the above-mentioned orientation function without contaminating the surface of the film.

ii) Description of the Related Art

Prior art orientation films for liquid crystal devices include a film comprising an insulating material such as polyimide resin treated with rubbing process in a single direction using cloth and the like, a film formed by oblique evaporation of silicon dioxide ($SiO_2$), and the like.

As to the orientation films obtained by rubbing process, however, there have been problems such as the occurrence of dust and the generation of static electricity during the rubbing process for the preparation of such orientation films.

The films obtained by oblique evaporation are too costly for the preparation thereof and the process is difficult to use for the preparation of film having a large surface area. Disadvantageously, they cannot meet the large-scale production demands of liquid crystal devices.

Prior art orientation films are also formed by stamp method.

The orientation films formed by stamp method are films produced by stamping thermoplastic-resin films formed on a heated substrate to prepare an irregular form on the surface thereof. The surface form of orientation films produced by conventional stamp method is composed of a great number of convex streaks 6 formed almost parallel on substrate 5, as is shown in FIG. 6, which is designed so that the cross section of the convex streaks 6 may be in bilateral symmetry to the vertical line pulled down from the top L thereof.

Alternatively, a conventional super-twisted nematic (abbreviated as STN hereinafter)-type LCD is in the structure shown in FIG. 21.

On substrate 41 of the LCD is formed transparent electrode 46 comprising a film of indium and tin oxide (abbreviated as ITO hereinafter). On the transparent electrode 46 is formed a film of high-molecular compounds including silicon dioxide, polyimide, and the like, after the treatment with rubbing process. In the space between two substrates 41 where orientation film 45 is formed, is arranged a displaying liquid crystal layer 42. On one of the two substrates 41, is arranged a phase-difference plate 43, on which is positioned a polarization plate 44. The phase-difference plate 43 is to be arranged for the objective to eliminate the coloring in yellow or yellowish green when the LCD is observed frontally.

Furthermore, FIG. 36 is a schematic cross-sectional view of conventional liquid crystal. The liquid crystal comprises a sandwich structure composed of a combination of two substrates 61 wherein there are formed transparent electrode 62 and the orientation film 63 formed thereon, and the two substrates 61 are adhered together with sealing agent 64. The two substrates 61 are fixed together by a given distance via the sealing agent 64. Film 66 with optical anisotropy (abbreviated as optical film hereinafter) is appropriately adhered to the substrates 61 in cell 83 prepared in such manner. The optical film 66 includes a film having a function of phase-difference plate.

The fabrication of such liquid crystal device has conventionally been carried out by the following procedures. As is shown in FIG. 36, transparent electrode 62 is formed from a film of indium and tin oxide (abbreviated as ITO hereinafter). By obliquely evaporating silicon dioxide and the like or by coating a film of a polymer such as polyimide, a film is formed, followed by subjecting the film to the rubbing process comprising rubbing the film in one direction with fibers such as nylon, polyester and the like, whereby there is formed orientation film 63 with a function to arrange displaying liquid crystal 71 described hereinbelow in a predetermined direction.

The two substrates 61 are then combined together with sealing agent 64. Into the cell 83 thus prepared is injected displaying liquid crystal 71 from the injection inlet of liquid crystal. After the injection, the injection inlet of liquid crystal is sealed.

To the substrate 61 of the cell 83 thus prepared is adhered optical film 66 preliminarily cut out from an original plate. As the optical film 66, there may be used those produced by unilaterally drawing polyvinyl alcohol and the like. At the adhesion of the optical film 66 in such manner, a relative angle between the orientation axis of the displaying liquid crystal and the optical axis of the optical film 66 should be adjusted as designed.

However, the pretilt angle of such conventional orientation film gets as small as 0 to 1 degree, with the tendency to readily cause disclination, which is a critical defect as liquid crystal.

It is generally known that disclination tends to hardly occur if the pretilt angle is one degree or more.

If orientation film is formed with the rubbing process, there occur such problems as easier generation of dust or static electricity in the orientation film and the like. There is also a problem in that the form of the surface of the orientation film formed by rubbing process is less reproducible.

On the other hand, oblique evaporation has problems in its high cost and less reproducibility.

On conventional STN-type LCD, there should be arranged phase-difference plate 43 on one of the substrates 41, which lowers working efficiency. If the phase-difference plate 43 is only slightly made to bend in the conventional LCD, the difference in index of refraction between normal light and abnormal light varies at that portion, inducing the variation in the difference in index of refraction in one phase-difference plate 43. The conventional LCD has therefore a problem in that the displaying quality of the LCD is deteriorated due to the phase-difference plate 43.

In the large-scale production thereof, furthermore, the direction of the optical axis of optical film 66 cannot be accurately adjusted to the orientation axis of displaying liquid crystal 71, which affects disadvantageously the displaying quality.

At the preparation of the conventional liquid crystal, the orientation axis is determined by the rubbing process in a predetermined direction, on the basis of the end face of the substrate 61. Alternatively, the direction of the optical axis 66 of optical film is determined by adhering the optical film 66 cut out from the original plate to the substrate 61, based on the end face of the substrate 61, so that the optical axis might be in a predetermined direction in combination with glass substrate 61.

Therefore, the axial variation when the optical film 66 is cut from the original plate as well as the positional variation when the optical film 66 is adhered to the glass substrate 61 are accumulated together, so the direction of the optical axis of the optical film has hardly been adjusted accurately to the orientation axis.

According to the method for producing such conventional liquid crystal device, the orientation film 63 is formed by rubbing process, which is the cause of the low yield due to the contamination of the surface of the orientation film 63 via the generation of dust and static electricity during the rubbing process.

SUMMARY OF THE INVENTION

The present invention solves the above-described problems and is to provide an orientation film of high-quality liquid crystal, the method for producing the film, a liquid crystal device and the method for producing the same.

The present invention has been carried out in order to solve the problems described above, wherein the irregular form to be formed on an orientation film is formed in a first direction and a second direction crossing the first direction; and more preferably, the cross-sectional form of the convex portion in the second direction is bilaterally asymmetric.

The present invention is to provide a production method for forming the orientation film.

The orientation film of liquid crystal according to a first aspect of the present invention is characterized by having the irregular form repeated in the first direction and the irregular form repeated in the second direction crossing the first direction with a longer pitch than the pitch of the irregular form repeated in the first direction.

The orientation film of liquid crystal according to a second aspect of the present invention is characterized by having the irregular form repeated in the first direction and the irregular form repeated in the second direction crossing the first direction with a longer pitch than the pitch of the irregular form repeated in the first direction, and characterized in that the cross-sectional form of each convex portion of the irregular form repeated in the second direction with a longer pitch is bilaterally asymmetric.

The method for producing the orientation film of liquid crystal according to a third aspect of the present invention comprises pressing on the resin-formed surface of a substrate, a molding member having the irregular form repeated in the first direction and the irregular form repeated in the second direction crossing the first direction with a longer pitch than the pitch of the irregular form repeated in the first direction, thereby transferring the irregular form of the molding member onto the surface of the substrate.

The method for producing the orientation film of liquid crystal according to the third aspect of the present invention comprises preparing a first molding member having the irregular form repeated in the first direction and a second molding member having the irregular form repeated in the second direction crossing the first direction with a longer pitch than the pitch of the irregular form repeated in the first direction, pressing the first molding member or the second molding member on the resin-formed surface of the substrate, to transfer the irregular form of the first or the second molding member on the surface of the substrate, subsequently pressing the second or the first molding member to transfer the irregular form of the second or the first molding member, thereby sequentially transferring the irregular form of the first and the second molding members on the surface of the substrate.

The method for producing the orientation film of liquid crystal according to a fourth aspect of the present invention is characterized in that the cross-sectional form of the concave portion in the second direction is bilaterally asymmetric in the third production method.

The method for producing the orientation film of liquid crystal according to a fifth aspect of the present invention comprises subjecting a substrate with the surface having a first-layer photosensitive resin formed to a first holographic exposure for developing the substrate to form the irregularity on the first-layer photosensitive resin in the first direction or in the second direction, further forming a second-layer photosensitive resin thereon and subjecting subsequently the substrate to a second holographic exposure for development to sequentially form on the second-layer photosensitive resin, in the second direction crossing the irregularity firstly formed, the irregularity with a pitch longer than the pitch in the irregular form repeated in the first direction, or in the first direction, the irregularity with a pitch shorter than the pitch in the irregular form repeated in the second direction.

The method for producing the orientation film of liquid crystal according to a sixth aspect of the present invention comprises subjecting a substrate with a first-layer photosensitive resin formed thereon to a first holographic exposure for developing the substrate to form the irregularity on the first-layer photosensitive resin in the first direction or in the second direction, further forming a second-layer photosensitive resin and subjecting thereafter the substrate to a second holographic exposure for development to sequentially form on the second-layer photosensitive resin, in the second direction crossing the irregularity firstly formed, the irregularity with a pitch longer than the pitch in the irregular form repeated in the first direction, or in the first direction, the irregularity with a pitch shorter than the pitch in the irregular form repeated in the second direction, whereby the cross-sectional form of the convex portion with a longer pitch in the second direction is formed in bilateral asymmetry with ion-beam etching.

The orientation film of liquid crystal according to another aspect of the present invention has photosensitive resin having irregular form on the surface of a substrate body. In a preferable embodiment, photosensitive polyimide resin is used as the photosensitive resin.

The method for producing an orientation film of liquid crystal according to another aspect of the present invention comprises coating the photosensitive resin on the surface of a substrate body, subjecting the film of the photosensitive resin to photosensitive process for subsequent development, whereby it is formed an orientation film having irregular form with an orientation function on the surface thereof.

As such photosensitive resin, there are illustrated polyimide resin having Si—Si bond at the main chain shown in the following formula 1, cresol novolak resin mixed with naphthoquinone azide, cyclic rubber with aromatic bis-azide added, phenol resin mixed with aromatic azide, t-butoxy carbonate esterified polyvinyl phenol with onium acid added, polymethyl methacrylate, polybutene-1 sulfone, polyglycidyl methacrylate and the like.

Chemical Formula 1

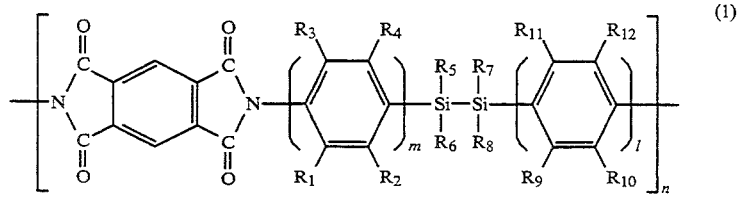

(wherein R1, R2, R3, R4, R5, R6, R7, R8, R9, R10, R11, and R12 individually represent H, F, and saturated hydrocarbon of CnH2n+1, methoxy group or ethoxy group; m is 1 or 2; and 1 is 1 or 2).

Among them, the photosensitive polyimide resin having Si—Si bond at the main chain, in particular, is suitable for microfine fabrication, so the resin is preferable for the practice of the present invention. As the means for forming the film comprising the photosensitive resin on a substrate, there may be employed various means such as coating method, spin-coating method, dip-coating method, Langmuir-Blodgett method, and the like.

For the photosensitive process of the film comprising the photosensitive resin, there may be utilized electron beam, besides various electromagnetic waves including visible ray, ultra-violet ray, X ray, γ ray and the like.

For the irregular form to be formed, there may be employed various forms such as the form in which the convex streaks and grooves are formed in almost parallel manner and which cross section is in the form of sin wave, rectangular wave or triangle wave. Specifically, the irregular form wherein the cross-sectional view of the convex streaks is bilaterally asymmetric is advantageous in that the pretilt angle of a displaying liquid crystal can be made larger. In case that the convex streaks and grooves are formed in almost parallel manner, the pitch is appropriately 5 μm or less, preferably 1 μm or less, in order to improve the orientation property of the displaying liquid crystal up to the level practically usable. The convex streaks in the irregular form to be formed is not necessarily in single direction, but may satisfactorily be formed in the direction where the streaks cross each other.

The LCD according to the present invention has been achieved in order to solve the problems described above, wherein a base layer having an irregular form is formed on a substrate and subsequently a film comprising a high-molecular liquid crystal (abbreviated as high-molecular liquid crystal film hereinafter) is formed thereon, whereby the problems described above are solved.

The problems described above are solved by the liquid crystal device wherein an inner film having a layer comprising a high-molecular liquid crystal and which inner surface is in an irregular form, is mounted on a substrate.

The problems described above are solved by the production method comprises forming an film having a layer comprising a high-molecular liquid crystal on a substrate, pressing the film with a stamper having irregularity under heating, thereby forming an irregular form on the surface of the film, along with the orientation process of the high-molecular liquid crystal in a magnetic field or an electric field applied, and subsequently maintaining the orientation status to cure the high-molecular liquid crystal.

The pretilt angle can be made larger, by having the irregular form repeated in the first direction and the irregular form repeated with a longer pitch than the pitch of the irregular form repeated in the first direction, as in the orientation film of the present invention. Therefore, the orientation property gets more excellent and the occurrence of disinclination tends to be less.

In a preferred embodiment, the operation described above gets more remarkable by rendering the form of the cross section of the convex portion in the second direction, into bilateral asymmetry.

According to the production method of the present invention, the orientation film described above can be produced with good productivity and in secure manner.

By using a photosensitive resin, the orientation film having the irregular form on the surface thereof can be formed with good reproducibility formed. The film comprising a photosensitive resin is subjected to photosensitive process with a predetermined pattern and a predetermined quantity of light, which is then developed to form a predetermined pattern. By appropriately selecting the quantity of light for irradiation, a film comprising a photosensitive resin can be left even at the bottom of the portion of grooves. According to the present invention an microfine orientation film having the irregular form can be formed with good reproducibility.

Because the base layer having irregular form is formed on a substrate and a high-molecular liquid crystal film is formed thereon, in accordance with an aspect of the present invention, the component of the low-molecular liquid crystal group in the high-molecular liquid crystal in the film described above is aligned in the direction where the concave portion of the irregular form of the base layer extends, if the high-molecular liquid crystal film formed on the base layer is heated up to the level of an anisotropic fluid and is subsequently annealed gradually down to neomatic phase. Since the component of the low-molecular liquid crystal group of the high-molecular liquid crystal film is aligned in a single direction, the light transmitting through the film induces the phase difference. The phase difference can be controlled by the film thickness of the high-molecular liquid crystal film.

Because the inner film having a layer comprising a high-molecular liquid crystal and having the surface of irregular form is arranged onto a substrate in the liquid crystal device according to another aspect of the present invention, the inner film should have the function of a film provided with optical anisotropy. Furthermore, irregular form is arranged on the surface of the inner film, so the molecules of displaying liquid crystal is oriented due to the irregular form, imparting orientation function to the inner film.

In accordance with the production method of the present invention, a film having a layer comprising high-molecular liquid crystal is formed on a substrate; the film is thermally pressed with a stamper to transfer the irregular form on the film surface, along with the orientation process of the high-molecular liquid crystal under the application of magnetic field or electric field; and subsequently the high-molecular liquid crystal is cured without deteriorating the orientation status, so that the film is provided with the orientation function via the irregular form transferred onto the surface.

If the high-molecular liquid crystal is subjected to orientation process, the low-molecular liquid crystal group of the high-molecular liquid crystal is oriented, so that the film having a layer comprising the high-molecular liquid crystal is provided with the function of an optically anisotropic film. The function of the film provided with optical anisotropy includes the function of phase-difference plate.

Furthermore, there is no need to subject the surface of the film having the orientation function to rubbing process, or there is no contamination of the surface of the film.

DESCRIPTION OF PREFERRED EMBODIMENTS

EXAMPLE 1

Figure 1:
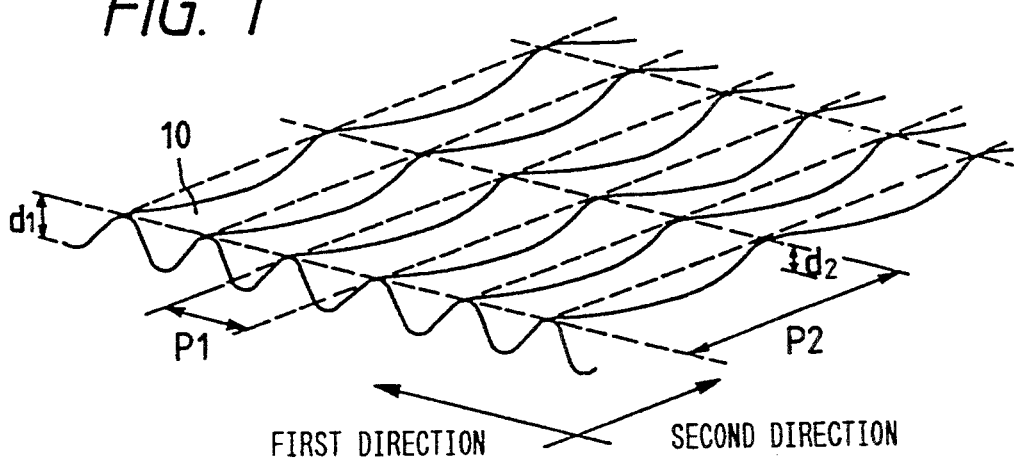
FIG. 1 is a perspective view of the orientation film of Example 1.

The orientation film of Example 1 is shown in FIG. 1. In the figure, the symbol 10 represents an orientation film which comprises a resin. The orientation film 10 is formed on a substrate with a transparent electrode. As shown by the arrow in the figure, there are formed the irregularity in a first direction and the irregularity in a second direction crossing the first direction.

The pitch P1 of the irregularity in the first direction is rendered shorter than the pitch P2 in the second direction. The pitch P1 and P2 are preferably 30 $\mu$m or less and 100 $\mu$m or less, respectively. More preferable conditions are such that the pitch P1 and P2 are 1.2 $\mu$m or less and 50 $\mu$m or less, respectively.

The depth d1 and d2 are 0.5 $\mu$m or less, individually.

The cross-sectional form of the convex streaks may be either of a form similar to sin wave, tandem type, trapezoid, rectangle, triangle and the like. Among them, a triangular form is the most preferable with from the respect to improving the orientation property of liquid crystal. In such case, the top of a triangular form may satisfactorily be rounded or cut flat.

The production method of the orientation film will now be explained hereinafter.

A ruling engine of a diamond needle (wherein the vertical angle of the needle is 5°, for example) is used as a molding member, to form the irregularity repeated with a longer pitch in the second direction (for example with a pitch of 6 $\mu$m and a depth of 0.1 $\mu$m).

Figure 4:
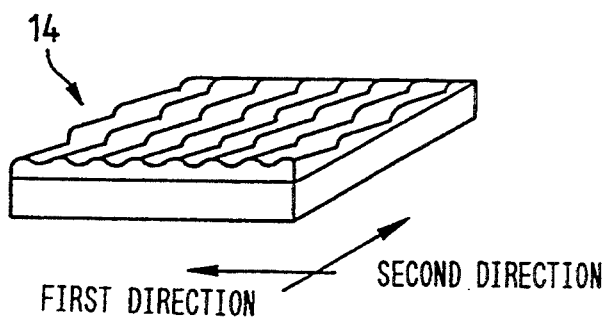
FIG. 4 is a perspective view of a molding member used in Examples 2 and 3.

Rotating the molding member and forming the irregularity repeated with a shorter pitch (for example with a pitch of 1.0 $\mu$m and a depth of 0.1 $\mu$m) in the first direction crossing the irregularity previously formed, a molding member 14 as shown in FIG. 4 is prepared.

The angle rotating the molding member has influence on the angle made by the crossing of the first direction and the second direction. Most preferably, the rotation is effected at 90°. The rotation in a range of 60° to 120° can exhibit the advantage of the present invention.

Such irregularity may be formed firstly in either of a first direction or a second direction, but the irregular form may not be deteriorated when the formation is effected firstly in the second direction.

Onto a substrate with ITO coated with epoxy resin is pressed molding member 14 thus prepared, and the epoxy resin is then cured in such state. After the curing, the molding member 14 is peeled off to produce an orientation film comprising the epoxy resin on the substrate with ITO.

As the resin coated on the substrate with ITO, thermosetting resin such as epoxy resin and photosetting resin are suitable because such resins are less influential on molding members. However, even thermoplastic resin may produce the same effect.

EXAMPLE 2

Figure 2:
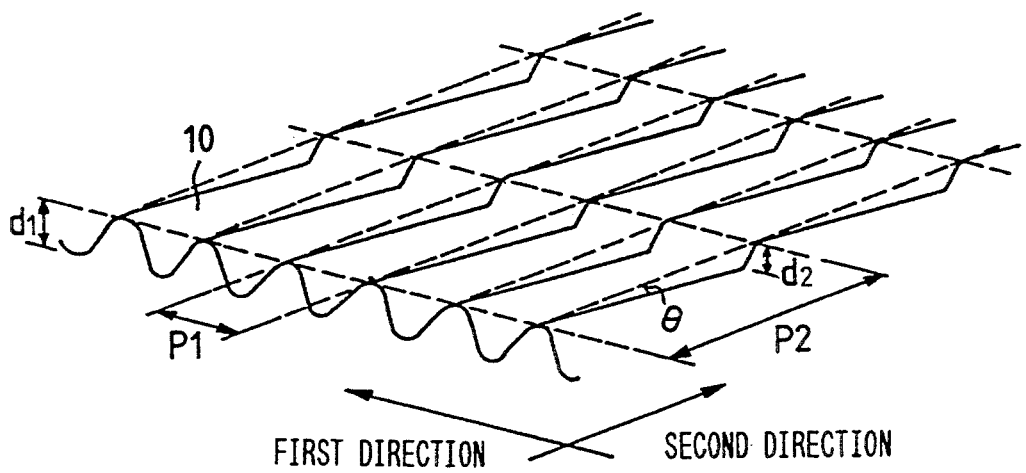
FIG. 2 is a perspective view of the orientation film of Example 2.

The orientation film of Example 2 is shown in FIG. 2. In the figure, the symbol 10 represents an orientation film comprising resin. The orientation film 10 is formed on a substrate with a transparent electrode. As shown by the arrow in the figure, there are formed the irregularity in a first direction and the irregularity in a second direction crossing the first direction.

The pitch P1 of the irregularity in the first direction is shorter than the pitch P2 in the second direction. The pitch P1 and P2 are preferably 3.0 $\mu$m or less and 100 $\mu$m or less, respectively. More preferable conditions are such that the pitch P1 and P2 are preferably 1.2 $\mu$m or less and 50 $\mu$m or less, respectively.

The depth d1 and d2 are 0.5 $\mu$m or less, individually. The slope $\theta$ of gradual hypotenuse of the irregularity in the second direction is preferably 0.01° to 30°.

Figure 3:
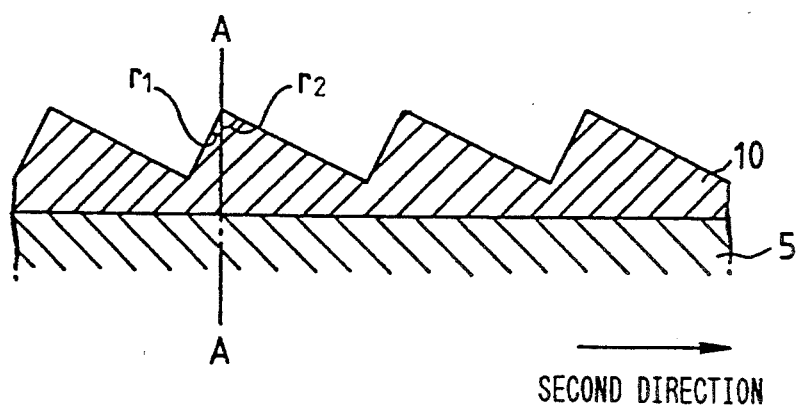
FIG. 3 is a cross-sectional view of the irregularity in a second direction of the orientation film of Example 2.

As is shown in FIG. 3, each of the convex portion of the irregularity in the second direction is schematically in a bilaterally asymmetric triangle form. The form is such that the ratio of the bilateral angles in the vertical angle, divided by vertical line A pulled down from the top thereof, namely $\gamma 2/\gamma 1$, is not 1.

The cross-sectional form of the convex streaks includes various forms such as a form similar to sin wave, tandem type, a triangle or the like. Among them, a triangle form is the most preferable with respect to improving the orientation property of liquid crystal. In such case, the top portion of a triangle form may satisfactorily be rounded or cut flat. When convex streaks have the cross section of triangle form, the ratio of the bilateral angles in the vertical angle, divided by vertical line A pulled down from the top thereof, namely $\gamma 2/\gamma 1$, may preferably be in a range of 1.2 or more. The pretilt angle is in an appropriate size, if the ratio is set in the range.

EXAMPLE 3

Orientation film similar to those as in Examples 1 and 2 are prepared according to the second production method.

As in Example 1, there is formed the irregularity with a longer pitch repeated in the second direction, using a ruling engine of a diamond needle (for example, a pitch of 4 $\mu$m and a depth of 0.1 $\mu$m) as a molding member.

The molding member is rotated at 90° to form the irregularity repeated with a shorter pitch in the first direction crossing the irregularity previously formed (for example, a pitch of 0.5 $\mu$m and a depth of 0.1 $\mu$m) to prepare the molding member 14 as shown in FIG. 4.

The advantage of the present invention can be exhibited in the present Example if the angle rotating the molding member (angle made by the first direction and the second direction) is in a range of 60° to 120°.

Nickel is plated onto the molding member 14 thus prepared. Plating may be carried out by wet or dry method. After the fixing of nickel plating, the nickel plating is peeled off, which is used as nickel stamp.

As the metal to prepare stamp, nickel is the most suitable. However, the metal is not limited to this, and other metals and alloy may be satisfactory. Furthermore, it is not necessarily metal. Resin (for example, silicon resin) may be used for forging, which is then used as stamp. A silicon resin through forging is also used for forging with epoxy resin, which is then used as a stamp.

Then, the nickel stamp thus prepared is, pressed in heating status (around 200° C.) onto a resin-coated transparent substrate with ITO, to transfer the irregularity onto the resin to prepare an orientation film.

The resin to be used may preferably be those with a heat-resisting temperature of 130° C. or more. At the production of liquid crystal device, annealing is effected at a temperature around 100° C. in order to render the liquid crystal once into isotropic state. If the heat-resisting temperature of the resin to be used is 130° C. or less, there is a possibility of the change of the surface form of the orientation film at the annealing process.

EXAMPLE 4

Orientation film is prepared according to the third production method (pressing method).

Using a ruling engine of a diamond needle (for example, a pitch of 1.5 μm and a depth of 0.1 μm), there is formed the irregularity repeated with a longer pitch to form a second molding member.

Nickel is plated onto the second molding member thus prepared. Subsequently, the nickel plating is peeled off, which is used as second nickel stamp.

The nickel stamp thus prepared is pressed in heating status onto a thermoplastic resin-coated glass substrate of ITO, to transfer the irregularity onto the resin.

In the same manner, using a ruling engine of a diamond needle (for example, a pitch of 0.15 μm and a depth of 0.01 μm), there is formed the irregularity repeated with a shorter pitch to form a first molding member (the pitch of the irregularity to be formed on the first molding member is smaller to the pitch of the irregularity of the second molding member).

Nickel is plated onto the first molding member thus prepared. Subsequently, the nickel plating is peeled off, which is then used as first nickel stamp.

Using a pressing machine and in the direction of the irregularity previously formed, the first nickel stamp thus prepared is pressed in heating status onto a glass substrate of ITO, wherein the irregularity is formed with a second nickel stamp and which is coated with thermoplastic resin, to transfer the irregularity onto the resin. In such manner, the orientation film with the irregularity thus formed in the first direction as well as the second direction as is shown in FIG. 2 is produced.

The pressing may be effected, starting either of the first nickel stamp and the second nickel stamp.

In the Example 4, there is illustrated an example wherein a stamp is prepared from a molding member and the stamp is sequentially pressed. As in Example 1, however, the advantage of the present invention may be exhibited by direct pressing with the molding member.

EXAMPLE 5

Orientation film is further prepared according to the fourth production method.

Figure 5A:
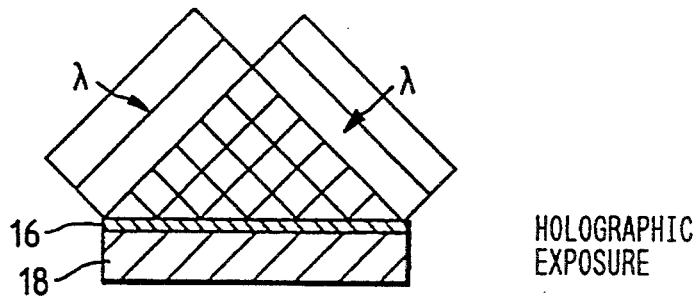
FIG. 5 is a process scheme of the production method of Example 5, wherein FIG. 5 (a) to (d) are cross-sectional views and FIG. 5 (e) is a perspective view.
Figure 5B:
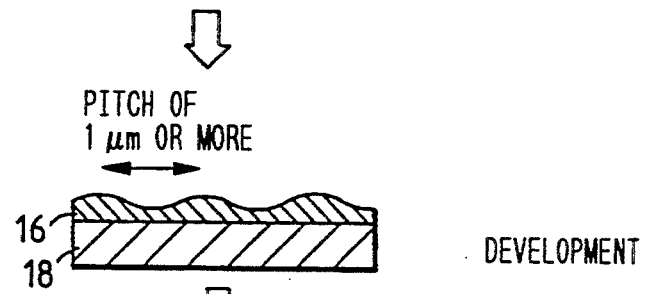

As is shown in FIG. 5(a), holographic exposure with a wave length λ (λ can appropriately be determined depending on the irregularity to be formed) is effected onto glass substrate 18 of ITO coated with first photosensitive resin 16, which is then developed to form on the first photosensitive resin 16 the irregularity with a pitch of 1 μm or more in the second direction as is shown in FIG. 5(b).

Figure 5C:
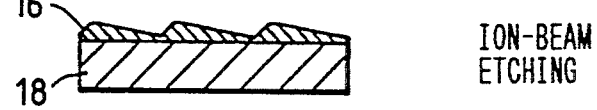

As is shown in FIG. 5(c), with ion-beam etching, there is formed the irregularity wherein the cross section of the convex portion is a triangle form, bilaterally asymmetric.

Figure 5D:
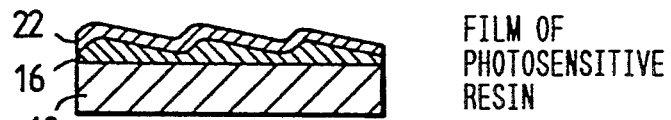
Figure 5E:
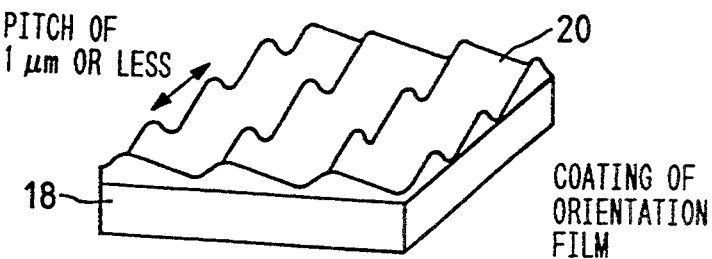
Figure 6:
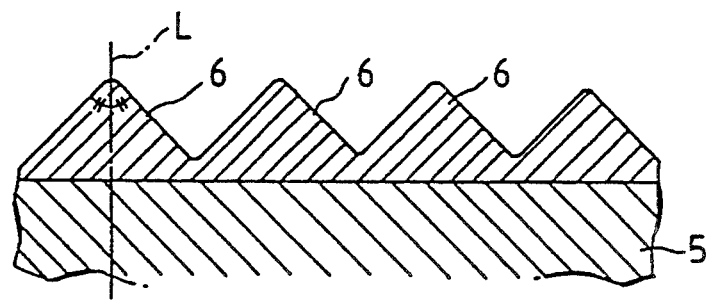
FIG. 6 is a cross-sectional view of the orientation film of a conventional example.

Then, the second photosensitive resin 22 is further coated (FIG. 5(d)), and by rotating the substrate by about 90°, holographic exposure is again effected, which is then developed to form the irregularity with a pitch of less than 1 μm in the first direction. Thus, there is formed a photosensitive resin with the irregularity formed in the first and the second directions.

Onto the photosensitive resin with the irregularity thus formed, coating with polyimide resin is effected to produce orientation film 20.

EXAMPLE 6

Orientation film is prepared according to the fifth production method.

As in Example 5 and in FIG. 5(a), holographic exposure with a wave length λ (λ can appropriately be determined depending on the irregularity to be formed) is effected onto glass substrate 18 of ITO, coated with first photosensitive resin 16, which is then developed to form the irregularity with a pitch of less than 1 μm in the first direction on the first photosensitive resin 16.

Then, the second photosensitive resin is further coated, and by rotating the substrate by about 90°, holographic exposure is again effected, which is then developed to form the irregularity with a pitch of less than 1 μm or more in the second direction.

As in Example 5, subsequently, the irregularity with the cross-sectional form of the convex portion in a triangle form bilaterally asymmetric, is formed with ion-beam etching.

Thus, there is formed the photosensitive resin with the irregularity formed in the first and the second directions.

Coating with polyimide resin is effected onto the photosensitive resin with the irregularity thus formed, to produce orientation film 20.

Test Example

Following the method described in Example 4, each of the orientation films as shown in Example 1 is prepared employing the materials for orientation film, and the methods for forming irregularity with the pitch and depth in the first and second directions. Then, the pretilt angle and order parameter of the liquid crystal devices using each of the orientation films were determined.

Following the methods described in Example 4, the orientation film shown in Example 2 is prepared. Using the same, a liquid crystal device is fabricated to determine the same properties as shown in Table 2.

At the test, a spacer of a diameter of 10 μm is turned around the substrate with the orientation film thus formed, and parallel cells, sealed and fabricated, are prepared for the injection of liquid crystal.

The form of the irregularity in the second direction is of a triangular wave form; the form of the irregularity with a pitch of 0.27 μm in the first direction is the form of sin wave while the form with a pitch of 0.55 μm is the form of triangular wave.

For the measurement of pretilt angle, liquid crystal for fluorine TN cell is injected as liquid crystal, to determine the angle according to the method of magnetic-field volume.

For the measurement of order parameter, one hundred parts of the liquid crystal for TN and one part by weight of a bicolored pigment (LSB-278; manufactured by Mitsubishi Kasei Kabushiki Kaisha) are injected into a parallel cell. After the sealing of the injection inlet, the bicolored ratio is measured to calculate the order parameter.

The order parameter "S" is herein calculated, by measuring the absorbance A when the polarization axis is vertically adjusted to the first direction and the absorbance A′ when the polarization axis is adjusted paralleling to the first direction, using a photometer, and then inserting the results from the measurement into Mathematical Formula 1.

Order parameter $S = (A - A')/(2A' + A)$   Mathematical Formula 1

The results are shown in Tables 1 and 2.

effect such that the pretilt angle of 2° or more is obtained.

According to the orientation film of the present example, having the irregular form repeated in the first

TABLE 1

| No. | 1 | 2 | 3 | 4 | 5 |
|---|---|---|---|---|---|
| Orientation film | PES | PES | PES | PES | PES |
| Method for forming irregularity | press method pressing Temp. 200° C. pressing pressure 10 kg/cm² in transverse direction 30 kg/cm² in longitudinal direction | Same as described at left | Same as described at left | Same as described at left | Same as described at left |
| Irregularity in second direction | pitch 1.7 μm depth 0.1 μm | pitch 1.1 μm depth 0.1 μm | pitch 1.1 μm depth 0.05 μm | pitch 1.1 μm depth 0.05 μm | pitch 2.0 μm depth 0.1 μm |
| Irregularity in first direction | pitch 0.27 μm depth 0.1 μm | pitch 0.27 μm depth 0.1 μm | pitch 0.27 μm depth 0.1 μm | pitch 0.55 μm depth 0.1 μm | pitch 0.27 μm depth 0.1 μm |
| Pretilt angle | 2.4° | 4.2° | 1.9° | 1.6° | 2.2° |
| Order parameter | 0.78 | 0.75 | 0.77 | 0.70 | 0.78 |

| No. | 6 | 7 | Comparative Example 1 | Comparative Example 2 |
|---|---|---|---|---|
| Orientation film | liquid crystal polyester (LC-3000) | Same as described at left | PES | PES |
| Method for forming irregularity | press method pressing Temp. 180° C. pressing pressure 10 kg/cm² in transverse direction 30 kg/cm² in longitudinal direction | Same as described at left | press method pressing Temp. 200° C. pressing pressure 10 kg/cm² in transverse direction 30 kg/cm² in longitudinal direction | rubbing method |
| Irregularity in second direction | pitch 1.7 μm depth 0.1 μm | pitch 1.1 μm depth 0.1 μm | pitch 0.55 μm depth 0.1 μm | |
| Irregularity in first direction | pitch 0.27 μm depth 0.1 μm | pitch 0.27 μm depth 0.1 μm | pitch 0.55 μm depth 0.1 μm | |
| Pretilt angle | 2.2° | 4.0 | not measurable | 0.6 |
| Order parameter | 0.80 | 0.78 | 0.56 | 0.76 |

TABLE 2

| No. | 1 | 2 | 3 | 4 | 5 | 6 | 7 |
|---|---|---|---|---|---|---|---|
| Orientation film | PES | PES | PES | PES | PES | liquid crystal polyester (LC-3000) | Same as described at left |
| Method for forming irregularity | press method pressing Temp. 200° C. pressing pressure 10 kg/cm² in transverse direction 30 kg/cm² in longitudinal direction | Same as described at left | Same as described at left | Same as described at left | Same as described at left | press method pressing Temp. 180° C. pressing pressure 10 kg/cm² in transverse direction 30 kg/cm² in longitudinal direction | Same as described at left |
| Irregularity in second direction | pitch 1.7 μm depth 0.1 μm | pitch 1.1 μm depth 0.1 μm | pitch 1.1 μm depth 0.05 μm | pitch 1.1 μm depth 0.05 μm | pitch 2.0 μm depth 0.1 μm | pitch 1.7 μm depth 0.1 μm | pitch 1.1 μm depth 0.1 μm |
| Irregularity in first direction | pitch 0.27 μm depth 0.1 μm | pitch 0.27 μm depth 0.1 μm | pitch 0.27 μm depth 0.1 μm | pitch 0.55 μm depth 0.1 μm | pitch 0.27 μm depth 0.1 μm | pitch 0.27 μm depth 0.1 μm | pitch 0.27 μm depth 0.1 μm |
| Pretilt angle | 3.0° | 5.2° | 2.4° | 2.0° | 2.8° | 2.8° | 5.0° |
| Order parameter | 0.78 | 0.75 | 0.77 | 0.70 | 0.78 | 0.80 | 0.78 |

Table 1 indicates that, in Comparative Example 1 wherein the pitch of the irregularity in the first direction and the pitch of the irregularity in the second direction are the same, the pretilt angle is too small to be measured, and that the order parameter is as small as 0.56. The pretilt angle is as small as 0.6 even in those with the orientation film formed with rubbing process.

However, according to the orientation films prepared in the present example, all of the pretilt angle are as large as 1.6° or more, and the order parameters are preferable ones of 0.70 or more.

Table 2 showing the bilaterally asymmetric cross-sectional form of the convex portion of the irregularity repeated with a longer pitch, indicates a remarkable direction and the irregular form, in the second direction crossing the first direction, repeated with a longer pitch than the pitch repeated in the first direction, the pretilt angle is made larger and the order parameter is increased. Accordingly, the orientation property is so intense that the disclination hardly occurs.

The production method of the orientation film of the present example does not involve the generation of dust and the occurrence of static electricity, which has been characteristic to the methods by rubbing process and oblique evaporation; there do not occur problems including too costly production. Therefore, the irregularity in the first direction and the second direction can be formed.

The method using a nickel stamp, in particular, can transfer the irregularity with good reproducibility and more clearly.

EXAMPLE 7

Figure 7:
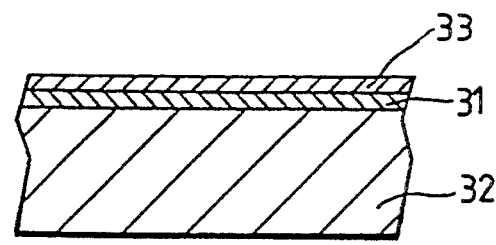
FIG. 7 is a cross-sectional view representing the status wherein the film of photosensitive polyimide is formed on the surface of the substrate.
Figure 8:
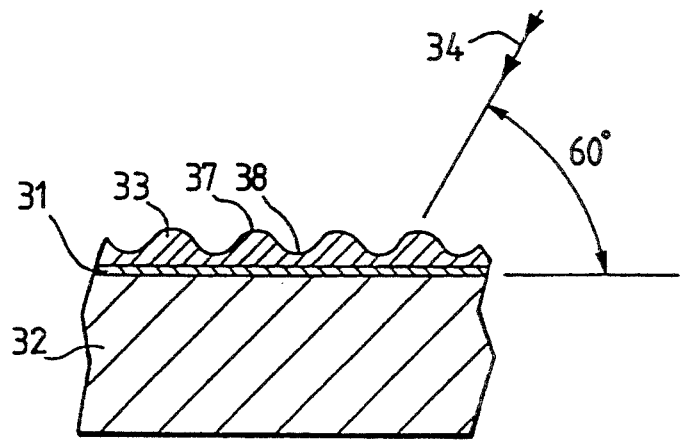
FIG. 8 is a cross-sectional view representing the status wherein the film of the photosensitive polyimide is developed.

With reference to FIGS. 7 and 8, the substrate for liquid crystal device of the present invention and the method for producing the same will now be explained hereinbelow.

In the present example, polyamide acid in n-methyl pyrrolidone (NMP) in solution is spin-coated onto a substrate body 32 with electrode 31, to a thickness of 0.2 μm, which was then prebaked at 250° C. for one hour for rendering it into imide compound to form film 3 comprising photosensitive polyimide, as shown in the formula 1 described above.

Chemical Formula 2

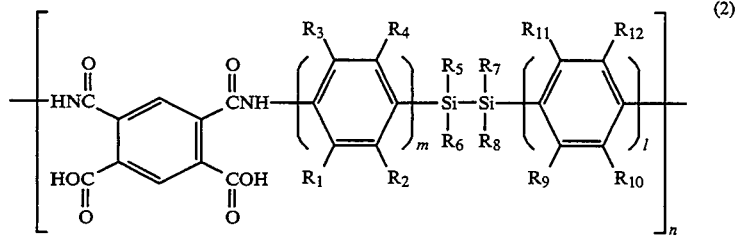

(2)

wherein R1 to R12, m and l are the same as described for the formula 1.

Using a mask with alternatively arranged lines and spaces each of a width of 0.25 μm, exposure treatment is effected with KrF exima laser (wave length, 248 nm; pulse energy, 0.18 mJ; exposure energy, 85.1 mJ/cm$^2$; pulse frequency, 200 Hz). Then, development is effected with a mixture of dimethyl acetoamide and ethanol (1:1) in solution. As a result, there is formed the irregular form wherein convex streaks 37 and grooves 38 are formed in parallel manner with good reproducibility. Because the exposure energy is set at 50 to 85% of the quantity of light necessary for completely removing the grooves, a film comprising photosensitive polyimide of a thickness of about 0.1 μm is left at the bottom of the grooves 38.

Figure 9:
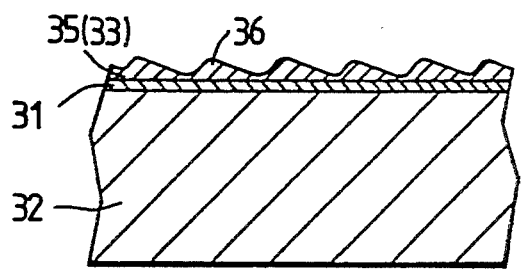
FIG. 9 is a cross-sectional view representing the substrate after completion for liquid crystal device.

Subsequently irradiating ion beam 34 onto the film 33 at the angle of 60° from the substrate body 32 as is shown in FIG. 8, etching is effected to make the irregular form of the surface of the film 33 into an irregular form with a blaze angle (an angle made by the surface of the substrate and the longer hypotenuse) of about 30° as is shown in FIG. 9, whereby the orientation film 35 is achieved. The cross-sectional form of each of the convex portion 36 of the orientation film 35 is bilaterally asymmetric to the vertical line pulled down from the top angle.

Using the substrate, a cell with a gap of 10 μm is prepared, followed by injection of 99 parts by weight of cyano TN liquid crystal and one part by weight of a blue pigment (LSB-278). Then, the ratio of the two colors is measured to calculate the order parameter. As a result, the order parameter is 0.75, and it is confirmed that the orientation film 35 produced in the present Example has good orientation property.

The order parameter "S" is herein calculated, by measuring the absorbance A when the polarization axis is adjusted paralleling to the longitudinal direction of the convex streaks of the orientation film 35 and the absorbance A' when the polarization axis is vertically adjusted to the longitudinal direction of the convex streaks, using a photometer, and then inserting the results from the measurement into Mathematical Formula 1.

Order parameter $S=(A-A')/(2A'+A)$      Mathematical Formula 1

The substrate for liquid crystal device of the present Example is composed of the resin with the irregularity comprising photosensitive polyimide, whereby there can be formed an orientation film having the irregular form with good reproducibility. According to the production method of the substrate for liquid crystal device of the present Example, film 33 comprising photosensitive polyimide having Si—Si bond at the main chain was formed for photosensitive process with a predetermined pattern and subsequent development, the Si—Si bond was broken down at the photosensitized part for effecting the process of preparation into lower-molecular compounds, which were removed at the process of development, whereby a pattern of a positive type was formed.

According to such substrate for liquid crystal device and the method for producing the same, there is no underlying cause of the generation of dust and static electricity, so excellent orientation film can be formed. According to the forming method, the irregular form can be formed by lithography which is used at the production of semiconductors, so orientation films can be formed in inexpensive manner and with good reproducibility.

EXAMPLE 8

Mixing the polyimide acid represented by the Chemical Formula 2 described above and the compound represented by the Chemical Formula 3, polyimide precursor represented by Formula 4 is synthesized.

Chemical Formula 3

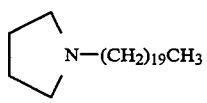

(3)

Chemical Formula 4

-continued

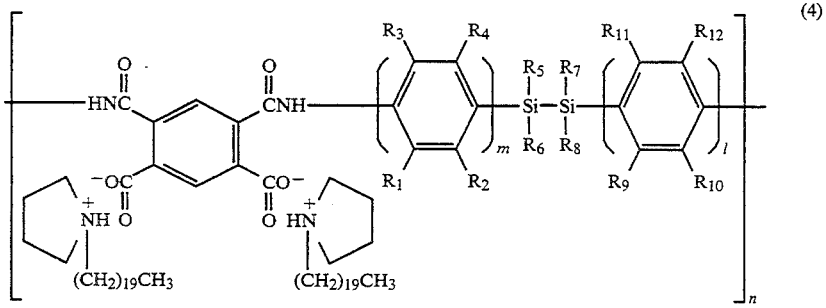

wherein R1 to, R12, m and 1 are the same as in Chemical Formula 1.

Onto the substrate body 32 with transparent electrode 31 formed is laminated one hundred layers of the synthesized polyimide precursor according to LB method, to produce the status shown in FIG. 7.

Following the same conditions as in Example 7, the polyimide precursor is rendered into imide compound.

As in Example 7, photosensitive process and development process were effected subsequently, followed by ion-beam etching, to form an orientation film almost similar to the film as in Example 7.

Using the substrate, the same cell as in Example 7 (cell gap of 10 μm) is formed, into which the same liquid crystal as in Example 7 is injected.

The order parameter of the liquid crystal device is measured to be 0.76, and it is confirmed that the orientation film 35 produced in the present Example exhibited good orientation property.

In the present Example, the same operational effect as in the present Example 7 could be obtained.

EXAMPLE 9

In the same manner as in Example 8, film 36 comprising photosensitive polyimide is formed. The film 36 was imaged with X ray, followed by development, to form the same orientation film 35 as in Example 7.

In the present Example, the same operational effect as in Example 7 is obtained. If holography is used as the method for forming irregular form, an irregular form with the cross section of sin wave form can readily be formed and utilized.

EXAMPLE 10

As in Example 7, onto a substrate body 32 with electrode 31 is spin-coated with a positive-type photosensitive resin (Cypray Ltd. Co., AZ 1350J) to a thickness of 0.2 μm, to form film 33 comprising photosensitive resin.

Using a mask with alternatively arranged lines and spaces each having a width of 0.25 μm, exposure treatment is effected with a high-pressure mercury vapor lamp. Then, development was effected with an aqueous 2.38% solution of tetramethyl ammonium hydroxide. Further effecting ion-beam etching, the orientation film 35, almost the same as in Example 7 is formed. Using the substrate, the same cell as in Example 7 is formed, whereby the same operational effect as in Example 7 is obtained.

EXAMPLE 11

As in Example 7, substrate body 2 with electrode 1 is spin-coated with a negative-type photosensitive resin (manufactured by Tokyo Oka, Co. Ltd. ) containing aromatic bisazide added to cyclic rubber, to a thickness of 0.2 μm to form film 33 comprising photosensitive resin.

Using a mask with alternatively arranged lines and spaces each having a width of 0.25 μm, exposure treatment is effected with a high-pressure mercury vapor lamp. Then, development is effected with a commercially available xylene developing agent (OMR developing agent, manufactured by Tokyo Oka, Co. Ltd.). Further effecting ion-beam etching, the orientation film 35, almost the same as in Example 7 is formed. Using the substrate, the same cell as in Example 7 is formed, whereby the same operational effect as in Example 7 is obtained.

EXAMPLE 12

As in Example 7, substrate body 2 with electrode 1 is spin-coated with a negative-type photosensitive resin (OEBR-100, manufactured by Tokyo Oka, Co. Ltd.), to a thickness of 0.2 μm, to form film 33 comprising photosensitive resin.

Using a mask with alternatively arranged lines and spaces each of a width of 0.25 μm, exposure treatment is effected with electron beam ($2.0 \times 10^{-6}$ C/cm$^2$; accelerating voltage, 20 KV). Then, development is effected with a commercially available specific developing agent. Further effecting ion-beam etching, the orientation film 35, almost the same as in Example 7 is formed. Using the substrate, the same cell as in Example 7 is formed, whereby the same operational effect as in Example 7 is obtained.

The limited Examples are described hereinabove. The photosensitive resin to be used in the present invention includes various products as described above. Various excitation sources for irradiation may be applicable, including visible ray, ultraviolet ray, X ray, γ ray, electron beam and the like.

EXAMPLE 13

Figure 10:
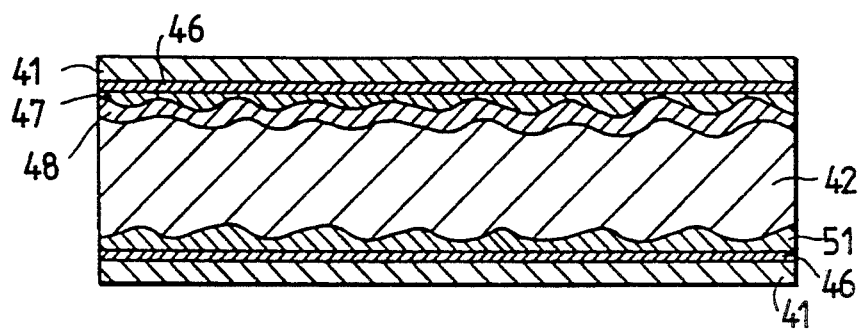
FIG. 10 is a cross-sectional view representing the LCD of Example 13.

FIG. 10 represents STN-type LCD of black-and-white type in the present Example.

Onto one substrate 41 of the LCD is formed transparent electrode 46 comprising ITO. Onto the transparent electrode 46 is formed base layer 47 comprising polyimide as a polymer with excellent heat resistance.

The surface of the base layer 47 has irregular form. The pitch of the irregularity was formed 0.02 to 2 μm.

Figure 14:
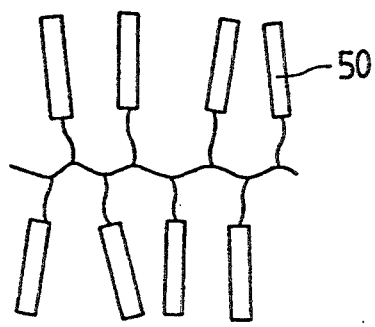
FIG. 14 is a schematic view representing the high-molecular liquid crystal of Chemical Formula 5.
Figure 18:
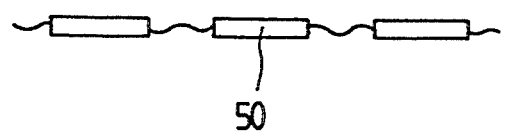
FIG. 18 is a cross-sectional view representing the high-molecular liquid crystal of Chemical Formula 6.

On the base layer 47 having the surface formed in the irregular form is formed high-molecular liquid crystal film 48. The high-molecular liquid crystal to be used in the film has either low-molecular liquid crystal group component 50 at the side chain thereof as is shown in FIG. 14, or low-molecular liquid crystal group component 50 at the main chain thereof as is shown in FIG. 18. The high-molecular liquid crystal film 48 is prepared by spin-coating the mixed solution of the high-molecular liquid crystal and hexamethylfluoroisopropyl alcohol at a ratio of 3:97 onto the base layer 47, and the surface of the high-molecular liquid crystal film 48 reflects the irregular form of the base layer 47.

The LCD of the present Example is produced by forming the base layer 47 having irregular form onto substrate 41 and forming high-molecular liquid crystal film 48 thereon, so the low-molecular liquid crystal group component of the high-molecular liquid crystal as the composition of the high-molecular liquid crystal film 48 is oriented in the extending direction of the concave portion (or the convex portion) of the irregular form of the base layer 47, when the high-molecular liquid crystal film 48 is heated up to the level of isotropic fluid and is then annealed gradually down to nematic phase.

When the low-molecular liquid crystal group component of the high-molecular liquid crystal is oriented in one direction in such manner, the light passing the high-molecular liquid crystal film 48 causes phase difference. The phase difference can be controlled by the film thickness of the high-molecular liquid crystal film 48.

That is, the high-molecular liquid crystal film 48 has the same function as that of the phase-difference plate 43 arranged on conventional STN-type LCDs.

Since the high-molecular liquid crystal film 48 has the function of phase-difference plate 43 in the LCD of the present Example, the phase-difference plate is thus not any more necessary.

Because the surface of the high-molecular liquid crystal film 48 is of the irregular form reflecting the irregular form of the base layer 47, displaying liquid crystal layer 42 is oriented. Therefore, the high-molecular liquid crystal film 48 also has the function as orientation film of the displaying liquid crystal layer 42.

Conventionally, the difference in index of refraction between normal light and abnormal light is not uniform, due to the slight folding of the phase-difference plate 43 during the process of adhering the phase-difference plate 43 onto a substrate. The result is such that the displaying quality of LCD may adversely be affected. In the LCD of the present invention, however, the high-molecular liquid crystal film 48 functioning as phase-difference plate 43 is formed by coating the liquid containing the high-molecular liquid crystal film onto the surface of the substrate 41. The troubles described above could be avoided.

The irregular form of the base layer 47 described above can be formed using a ruling engine, but such form can be formed using holography technique and ion-beam etching technique. Furthermore, a ruling engine is used to form a master having the surface wherein a form symmetric to the irregular form of the base layer 47 is formed, and the base layer 47 is stamped with the master to form the irregularity on the surface of the base layer 47. Otherwise, a ruling engine is used to produce grating wherein the same form as the surface of the base layer 47 is prepared, and metal plating is effected on the grating. Subsequently, the metal plating is peeled off and used as the master.

EXAMPLE 14

Figure 11:
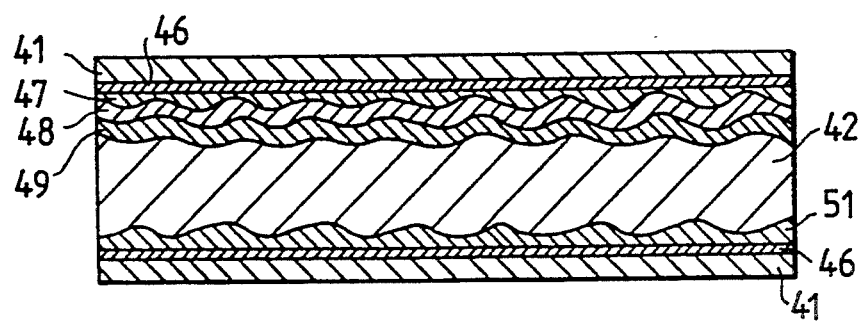
FIG. 11 is a cross-sectional view representing the LCD of Example 14.

The different point of the present Example from Example 13 is, as is shown in FIG. 11, that a material such as polyimide and the like, for conventional use as orientation film, is coated onto the high-molecular liquid crystal film 48 to form protective film 49. The irregular form of the base layer 47 is reflected onto the surface of the protective film 49. Because the protective film 49 is formed on the high-molecular liquid crystal film 48, the protective film 49 can prevent the reaction between the high-molecular liquid crystal film 48 and the displaying liquid crystal layer 42 in the present Example, in addition to the operational effect obtained by Example 13.

Accordingly, the LCD of the present Example can produce the advantage that the property of the high-molecular liquid crystal film 48 can be maintained for a long time by the protective film 49.

EXAMPLE 15

Figure 12:
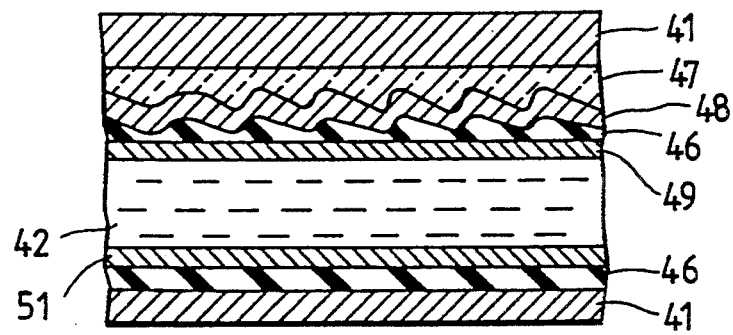
FIG. 12 is a cross-sectional view representing the LCD of Example 15.

The present Example is different from Example 14 in that transparent electrode 46 is formed in between high-molecular liquid crystal film 48 and protective film 49, as is shown in FIG. 12.

Because the troubles described above can be prevented due to the folding of a phase-different plate and additionally because transparent electrode 46 is positioned immediately near displaying liquid crystal layer 42 in accordance with the present invention, there can be obtained specific advantages in that drive voltage effectively works on the displaying liquid crystal layer 42 and that stable working property can be obtained.

EXAMPLE 16

Figure 13:
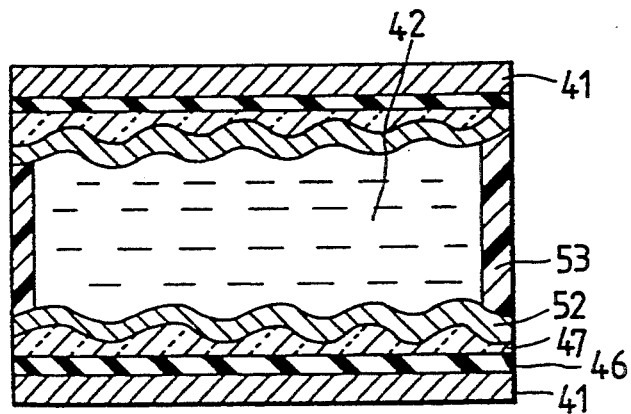
FIG. 13 is a cross-sectional view representing the LCD of Example 16.

FIG. 13 is a cross-sectional view of the LCD of the present Example. The composition of the LCD will now be explained hereinbelow.

Onto substrate 41 comprising glass is formed transparent electrode 46 comprising ITO. On the substrate is formed base layer 47. As the material of the base layer 47, there is used polyimide as a polymer with excellent heat resistance (A1-1054, manufactured by Nippon Rubber Kabushiki Kaisha).

The surface of the base layer 47 has irregular form. The irregularity is schematically of the form of sin wave, formed by rubbing process comprising rubbing the base layer 47 with fibers in one direction, and the pitch thereof is about 0.03 to about 2 μm.

Onto the base layer 47 formed by the process described above is a waiting film 52 comprising high-molecular liquid crystal with a bicolored pigment added.

The high-molecular liquid crystal to be used in the film is a high-molecular liquid crystal of polymethacrylic acid, as shown in Chemical Formula 5.

Chemical Formula 5

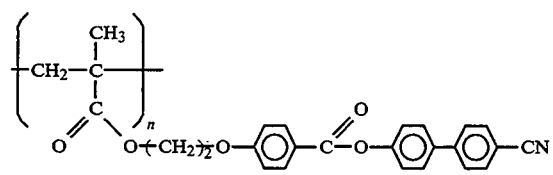

The liquid crystal is a high-molecular liquid crystal having low-molecular liquid crystal group component 50 at the side chain thereof as is shown in FIG. 14. As the bicolored pigment, a yellow pigment G232 (manufactured by Nippon Kanko Kabushiki Kaisha), a red pigment LSR405 (manufactured by Mitsubishi Kasei Kabushiki Kaisha), and a blue pigment LSB (manufactured by Mitsubishi Kasei Kabushiki Kaisha) are mixed together at a ratio of 1:1:1. The mixing ratio of the high-molecular liquid crystal and the bicolored pigment is 100:1 to 100:10.

If the mixed ratio of a bicolored pigment is lower than the range described above, the quantity of transmitting light without exposure to polarization effect increases and the function as polarization plate gets insufficient. If the mixed ratio of a bicolored pigment is higher than the range described above, the quantity of transmitting light decreases along with the decrease in the orientation degree of high-molecular liquid crystal or the bicolored pigment. Consequently, the function as polarization plate gets insufficient.

The mixed ratio of each pigment of the bicolored pigment and the mixed ratio of high-molecular liquid crystal and bicolored pigment are designed so that the intensity spectrum of light transmitting through all of the composition members of displaying liquid crystal layer 42 and the light-transmitting displaying portion of the LCD may be flat.

Film 52 comprising high-molecular liquid crystal with a bicolored pigment added is produced by the following processes. The solution produced by mixing the aforementioned high-molecular liquid crystal with the bicolored pigment added at a ratio of 3:97, is spin-coated, at 500 rpm for 10 seconds and subsequently at 3000 rpm for 30 seconds, onto the base layer 47. Then, the coated layer is left to stand and subsequently dried at 150° C. for one hour. After sufficient drying, the layer is heated up to a temperature where the high-molecular liquid crystal reached isotropic phase, namely 135° C. or more in this Example because the high-molecular liquid crystal of Chemical Formula 5 is used in the present Example. Then, the part of low-molecular liquid crystal group component 50 of the high-molecular liquid crystal has a certain degree of freedom, which then infiltrates into the concave portion of the irregular form formed on the surface of the base layer 47, for orientation. After the low-molecular liquid crystal group component 50 of the high-molecular liquid crystal is oriented, cooling is effected without damaging the orientation state. Annealing is preferable.

Two substrates 41 produced by the process described above are combined together with sealing agent 53 while maintaining a certain interval, and displaying liquid crystal layer 42 is formed between the substrates.

The LCD of the present Example is produced by forming the base layer 47 having irregular form onto substrate 41 and forming thereon high-molecular liquid crystal film 52 with a bicolored pigment added, so the low-molecular liquid crystal group component 50 of the high-molecular liquid crystal as the composition of the high-molecular liquid crystal film 48 is oriented in the concave portion of the irregular form of the base layer 47, and simultaneously the molecules of a bicolored pigment are oriented in the same direction, so the film 52 comprising the high-molecular liquid crystal with bicolored pigment added is to have the function of polarization plate in addition to the function as phase-difference plate. The irregularity of the base layer 47 can be formed based on the end face of substrate 41. Consequently, the direction of polarization axis can be determined based on the end face of the substrate 41. Therefore, the cutting process of polarization plate which has conventionally been the cause of the occurrence of displaying variation is not any more required. Therefore, the variation of polarization axis per device gets smaller in the LCD, leading to smaller displaying variation.

Since film 52 comprising high-molecular liquid crystal with a bicolored pigment added is formed onto the base layer 47 of the irregular form in the LCD of the present Example, irregular form may be induced on the surface of the film 52 comprising high-molecular liquid crystal with a bicolored pigment added. Because displaying liquid crystal molecules infiltrate into the irregular form of the film 52 comprising high-molecular liquid crystal with a bicolored pigment added for orientation, the film 52 comprising high-molecular liquid crystal with a bicolored pigment added gets the function of orientation film. Therefore, the orientation direction of the molecules of displaying liquid crystal layer 42 is determined by the irregular form of the base layer 47 in the present LCD and the polarization axis is also determined, whereby the orientation axis of displaying liquid crystal layer 42 naturally corresponds to the polarization axis of the film 52 comprising high-molecular liquid crystal with a bicolored pigment added. Therefore, the LCD is preferable for twisted nematic-type (TN).

EXAMPLE 17

Figure 15:
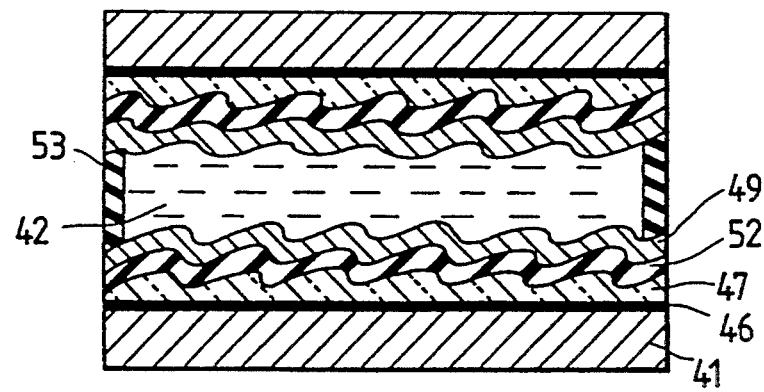
FIG. 15 is a cross-sectional view representing of the LCD of Example 17 and 18.

FIG. 15 represents the LCD of the present Example. Irregularity is formed on the base layer 47 in the LCD. As a material for the base layer 47, there is used polyether sulfone (4100G, manufactured by Mitsui Toatu Kabushiki Kaisha) with excellent heat resistance. While softening the base layer 47 by heating the base layer 47 and a stamp mold to a range of 180° to 250° C. as the temperature range endurable for the base layer 47 comprising the polymer, and by pressing the base layer 47 with the stamp mold at a pressure of 10 to 50 kg/cm$^2$, the irregular form is formed, wherein the concave portion is formed at a depth of 5 nm or more. The reason is as follows; if the depth is less than 5 nm, irregular form is not formed on the surface of the film 52 formed on the base layer 47.

The film 52 comprising high-molecular liquid crystal with a bicolored pigment added is coated onto the base layer 47. As the high-molecular liquid crystal to be used in the film 52, the same one as used in Example 16 was used. As the bicolored pigment, a yellow pigment G232 (manufactured by Nippon Kanko-sha), a red pigment LSR405 (manufactured by Mitsubishi Kasei Kabushiki Kaisha and a blue pigment LSB (manufactured by Mitsubishi Kasei Kabushiki Kaisha) are mixed together at a ratio of 0.5:1:0.5. The ratio of mixing the high-molecular liquid crystal and the bicolored pigment is 2:100. These are determined so as to satisfy the conditions for the mixing ratio, as shown in Example 16 described above.

The coating of the film 52 comprising high-molecular liquid crystal with the bicolored pigment added onto the base layer 47 was carried out as in Example 16.

Protective film 49 is formed onto the film 52 comprising the high-molecular liquid crystal with the bicolored pigment added. The protective film 49 is formed from a material such as polyimide and the like, which has conventionally been used as orientation film.

In the LCD of this Example, the same effect can be obtained as in the LCD of Example 16, and additionally, protective film 49 is formed onto the film 52 comprising high-molecular liquid crystal with the bicolored pigment added. Thus, the protective film 49 prevents the flow of the bicolored pigment from the film 52 comprising high-molecular liquid crystal with the bicolored pigment added into displaying liquid crystal layer 42.

Therefore, the LCD can produce the effect such that the property of the film 52 comprising high-molecular liquid crystal with the bicolored pigment having polarization function added can be maintained for a long period of time.

In the present Example, the irregular form of the base layer 47 may satisfactorily be formed, using a stamp mold with the irregular form prepared using a ruling engine, or using a stamp mold prepared by electrocasting of grating having the irregular form. Such irregular form may satisfactorily be formed by holographic technique and ion-beam irradiation.

EXAMPLE 18

The different point of the LCD of the present Example from the LCD of Example 17 is in that the base layer 47 and the irregular form of the surface thereof are formed by oblique evaporation of silicon dioxide. The same effect can be obtained from the LCD of the present Example as from the LCD of Example 17.

EXAMPLE 19

Figure 16:
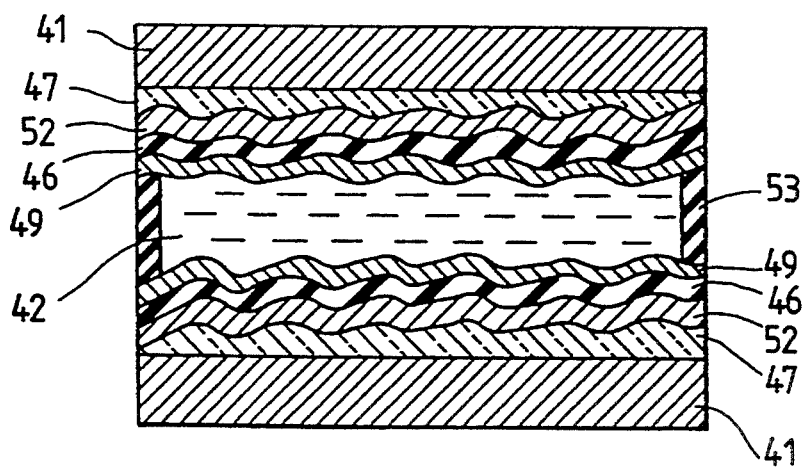
FIG. 16 is a cross-sectional view representing the LCD of Example 19.

The present Example is different from Example 16 in that transparent electrode 46 is formed in between high-molecular liquid crystal film 52 and protective film 49, as is shown in FIG. 16.

Because transparent electrode 46 is positioned immediately near displaying liquid crystal layer 42 in the LCD of the present Example, there can be obtained specific advantages in that drive voltage effectively works on the displaying liquid crystal layer 42 and in that stable working property can be obtained, in addition to the same operational effect as in Example 16.

EXAMPLE 20

Figure 17:
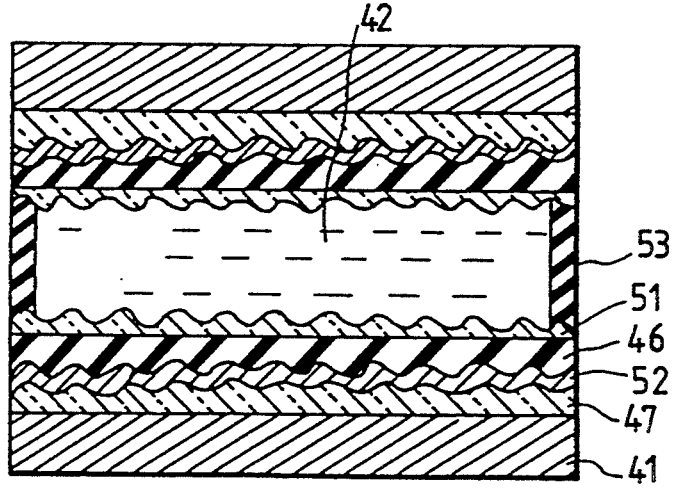
FIG. 17 is a cross-sectional view representing the LCD of Example 20.

FIG. 17 represents the LCD of the present Example, and the identical compositional parts to those in the Example described above are marked with the same symbols for schematic explanation.

In this LCD, there are formed base layer 47, film 52 comprising high-molecular liquid crystal with a bicolored pigment added, transparent electrode 46 and orientation layer 51.

The base layer 47 comprises polyimide with excellent heat resistance (AL-1054, manufactured by Nippon Synthetic Rubber, Co. Ltd.). The base layer 47 has irregular form. The irregular form is formed in the same method as the method shown in Example 13.

Film 52 comprising high-molecular liquid crystal with a bicolored pigment added is coated onto the base layer 47. The high-molecular liquid crystal to be used in the film 52 is a high-molecular liquid crystal of polyester represented by Chemical Formula 6.

Chemical Formula 6

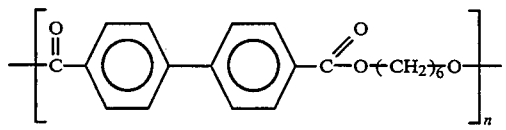

As is shown in FIG. 18, this crystal is a high-molecular liquid crystal having low-molecular liquid crystal group component 50 at the main chain. Iodine is used in the bicolored pigment. The mixed ratio of the high-molecular liquid crystal and the bicolored pigment is 100:4. These mixing ratio is designed so as to satisfy the conditions for the mixing ratio, shown in Example 17.

The film 52 comprising high-molecular liquid crystal with a bicolored pigment added is formed under almost the same conditions as in Example 16. Since the high-molecular liquid crystal of Chemical Formula 6 is used in the present Example, the orientation process of the high-molecular liquid crystal was effected by heating to 143° C. or more.

Transparent electrode 46 is formed onto the film 52 comprising the high-molecular liquid crystal with the bicolored pigment added. The top surface of the transparent electrode 46 is formed flat.

Because the top surface of the transparent electrode 46 is formed flat and orientation layer 51 is again formed thereon, the direction of polarization axis and the direction of orientation axis can be modified. Therefore, the LCD is suitable for the liquid crystal device of super-twisted nematic type.

In the LCD, the direction of polarization axis can be determined accurately to the direction of orientation axis. That is, the irregular form of the base layer 47 can be formed based on the end face of the substrate 41. Following the direction of the irregular form of the base layer 47, the molecules of the bicolored pigment in the film 52 comprising high-molecular liquid crystal with the bicolored pigment added are oriented, so the polarization axis can be determined based on the end face of the substrate 41. Since the irregular form of the orientation layer 51 can be formed based on the end face of the substrate 41 in the same manner, the orientation axis can be determined based on the end face of the substrate 41. As has been described above, both of the orientation axis and the polarization axis can be determined based on the end face of the substrate 41, so the LCD could produce the same operational effect as in Example 16.

EXAMPLE 21

Figure 19:
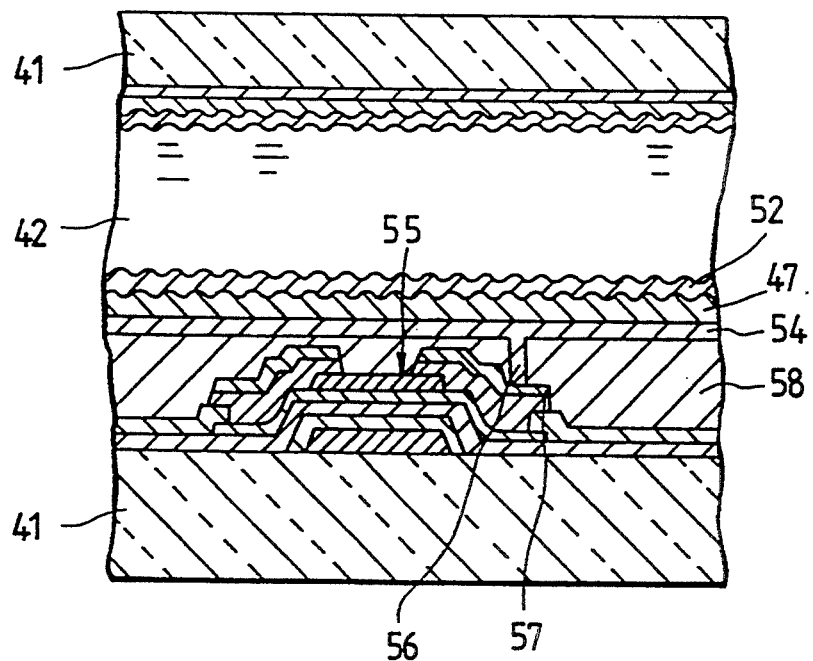
FIG. 19 is a cross-sectional view representing the LCD of Example 21.

FIG. 19 is a cross-sectional view of the LCD of the present Example. The different point of the LCD from that of Example 16 is that thin-film transistor 55 is arranged as switching device and that pixel electrode 54 is arranged above the thin-film transistor 55.

In the LCD of the present Example, the thin-film transistor 55 is formed onto the substrate 41. Leveling layer 58 is formed thereon. Pixel electrode 54 is formed above the leveling layer 58. The pixel electrode 54 is connected to the source electrode 57 of the thin-film transistor 55, through contact hole 56 on the leveling layer 58. On the pixel electrode 54 described above is formed the base layer 47 having irregular form, and on the layer is formed film 52 comprising high-molecular liquid crystal with bicolored pigment added.

In the LCD of the present Example, the advantages shown below are also obtained besides the same advantages as in Example 16.

Figure 22:
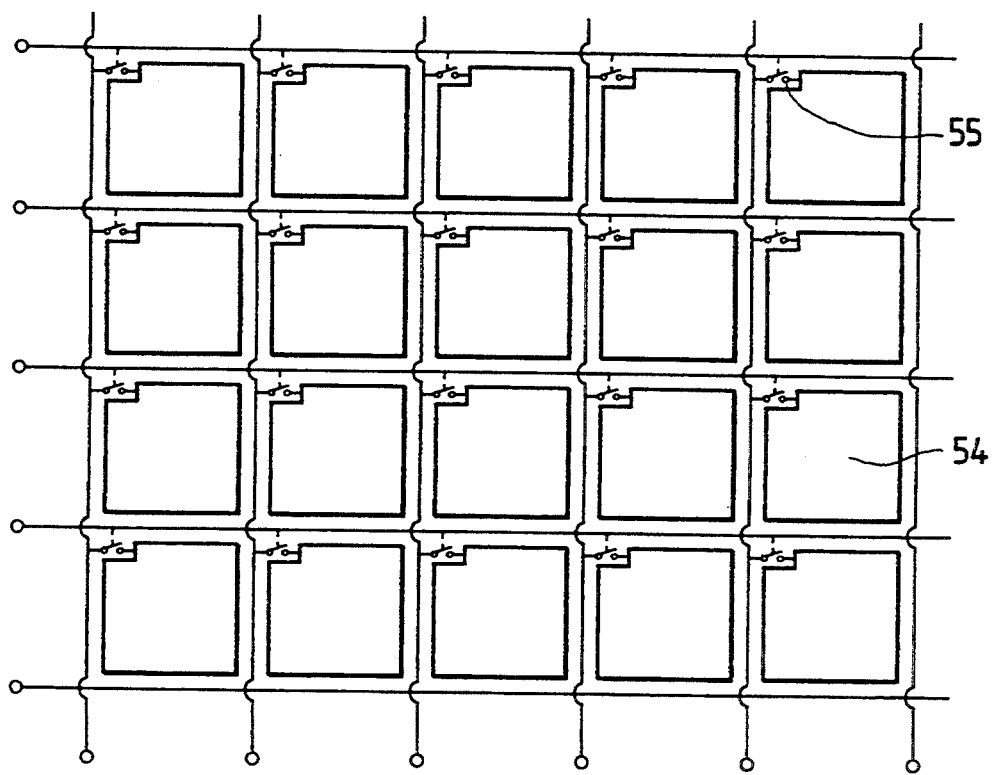
FIG. 22 is a schematic view representing the LCD provided with a conventional thin-film transistor.

In conventional thin-film transistor liquid crystal devices, thin-film transistor 55 and pixel electrode 54 are arranged at the same face as shown in FIG. 22. Therefore, the higher the density is, the smaller the area of the pixel electrode 54 is, causing rough picture plane. In the LCD of the present Example, the pixel electrode 54 is arranged above the thin-film transistor 55, so there is no need to decrease the pixel area occupied in the picture plane even if the pixel number is increased and the density is made larger. Thus, the deterioration of displaying quality can be avoided.

In all of Examples 16 to 21 thus explained above, film 52 having polarization function is formed within the sides of the inner face of the two substrates 41, facing each other, the interval of two films 52 having the function of polarization plate gets distinctively smaller, which remarkably improves the visibility (vision dependency) of display.

EXAMPLE 22

Figure 20:
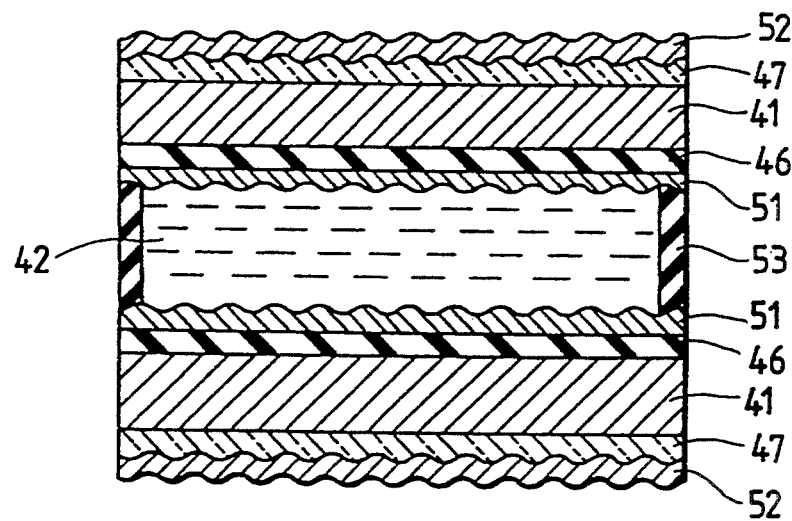
FIG. 20 is a cross-sectional view representing the LCD of Example 22.
Figure 21:
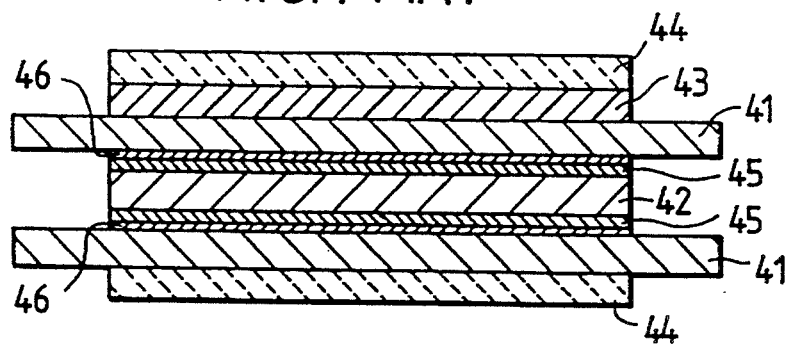
FIG. 21 is a cross-sectional view representing the LCD of conventional STN-type.
Figure 26:
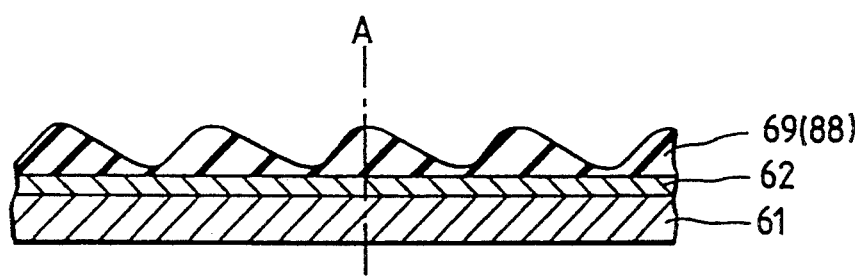
FIG. 26 is a cross-sectional view of the irregular form shown in FIG. 24, which is observed from the bilaterally asymmetric direction with a larger pitch.

As is shown in FIG. 20, the different point of the LCD of the present Example from Example 8 is that, ularity of sin wave form as is shown in FIG. 26. The irregular form, bilaterally asymmetric, is formed in the form of the bilaterally asymmetric irregular form interposing vertical line A pulled down from the top of each of the convex portion. The inner film 69 is formed by using a mixed solution of tetrafluoroisopropyl alcohol and high-molecular liquid crystal at a ratio of 100:3. As the high-molecular liquid crystal, there is used the compound having the low-molecular liquid crystal group at the side chain thereof, represented by Chemical Formula 7.

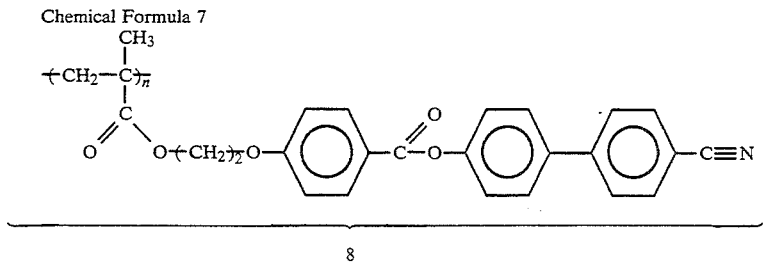

Chemical Formula 7

8 the base layer 47 and the film 52 comprising high-molecular liquid crystal with a bicolored pigment added are formed within the sides of the outer faces of two substrates 41, facing each other, while transparent electrode 46 and orientation layer 51 are formed within the sides of the inner faces of the substrates. In the present Example, the same operational effect is obtained as in Example 20.

As has been described above, the LCDs shown in Examples 16 to 22 are such that a base layer having irregular form is formed on a substrate and a film comprising high-molecular liquid crystal with a bicolored pigment added is formed thereon. Thus, the low-molecular liquid crystal group component of the high-molecular liquid crystal infiltrate into the concave portion of the base layer for orientation, concurrently with the alignment of the molecules of the bicolored pigment in a single direction, whereby the film comprising the high-molecular liquid crystal with the bicolored pigment added can get the function of polarization plate. Then, the LCD of the present invention does not require the cutting process of polarization plate which has conventionally been the cause of the occurrence of color shade. Because the irregularity of the base layer 47 can be formed based on the end face of the substrate 41, the direction of polarization axis consequently can be determined by the end face of the substrate 41. Therefore, the polarization axis can be formed in each device without variation, on the basis of the end face of the substrate, besides the operational effect shown in Examples 13 to 15, which can achieve the LCD with less displaying variation.

EXAMPLE 23

Figure 23:
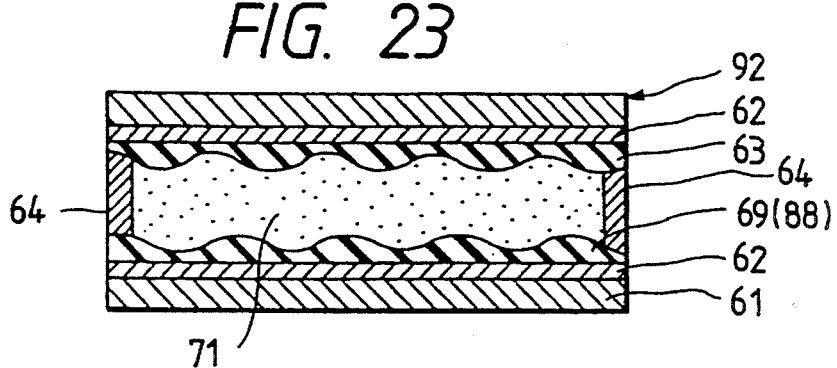
FIG. 23 is a cross-sectional view representing the liquid crystal device of Example 23.
Figure 24:
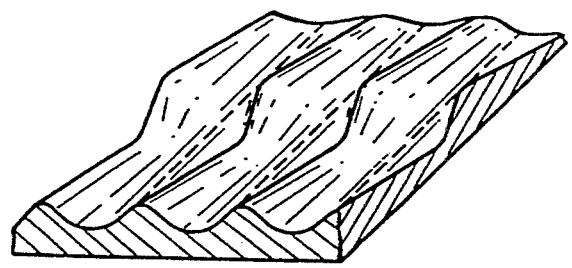
FIG. 24 is a perspective view representing the irregular form of the surface of the inner film of the liquid crystal device of Example 23.
Figure 25:
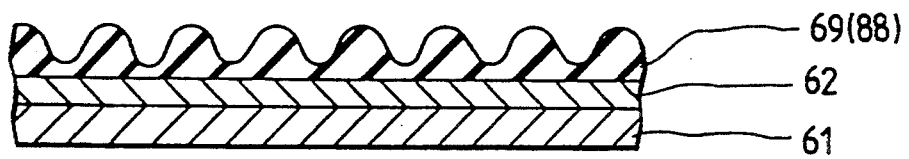
FIG. 25 is a cross-sectional view of the irregular form shown in FIG. 24, which is observed from the direction with a smaller pitch.

FIG. 23 represents the liquid crystal device of the present Example, wherein transparent electrode 62 comprising ITO can be formed on substrate 61. On the transparent electrode 62 is formed inner film 69 composed only of layer 88 comprising high-molecular liquid crystal. On the surface of the inner film 69 is formed the irregular form, as shown in FIG. 24. The irregular form is of the form that, irregularity of sin wave form with a smaller pitch is formed in one direction, as is shown in FIG. 25, and bilaterally asymmetric irregularity with a larger pitch is formed in the direction crossing the irreg- The low-molecular liquid crystal group 68 of high-molecular liquid crystal composing inner film 69 is oriented in a predetermined direction. Due to the orientation of the high-molecular liquid crystal in the predetermined direction, the inner film 69 can exhibit the function as optical film.

As is shown in FIG. 23, the substrate 61 thus prepared described above and the substrate 92 having the orientation function are adhered together with sealing agent 64. Displaying liquid crystal 71 is injected into the cell thus prepared.

In the liquid crystal device of the present Example, inner film 69 having layer 88 with the inner surface being of irregular form and comprising high-molecular liquid crystal is arranged onto substrate 61, so the low-molecular liquid crystal group of the high-molecular liquid crystal is orientated in an optional direction, whereby the function of optical film can be imparted to the inner film 69. Additionally, irregular form is arranged on the surface of the inner film 69, so that the inner film 69 can be provided with the orientation function.

In the liquid crystal device, irregular form can be formed on the inner film 69 based on the end face of the substrate 61, and the orientation process of the low-molecular liquid crystal group 68 of high-molecular liquid crystal can further be effected on the basis of the same end face of the substrate 61. Using the same criteria of the end face of the substrate 61, the optical axis and the orientation axis can be determined.

Accordingly, the displaying quality of the liquid crystal device can be improved because the direction of the optical axis can be more accurately and more readily adjusted to the orientation axis.

In the liquid crystal device of the present Example, irregularity of a sin wave form with a smaller pitch is formed in one direction, while bilaterally asymmetric irregularity with a larger pitch is formed in a direction crossing the above direction, as is shown in FIG. 26, so the pretilt angle of displaying liquid crystal 71 can be made larger by the operation of the bilaterally asymmetric irregular form with a larger pitch. According to the liquid crystal device of the present Example, disclination does not easily occur.

EXAMPLE 24

The liquid crystal device having the composition explained in the Example 23 described above can be produced by the following processes from 1 to 5.

1. Transparent electrode 62 comprising ITO and the like is formed on substrate 61 by photolithography.
2. High-molecular liquid crystal is coated onto the substrate to form inner film 69 having only layer 88 comprising high-molecular liquid crystal. As the inner film 69 in the present Example, there is employed a mixture of tetrafluoroisopropyl alcohol and high-molecular liquid crystal at a ratio of 100:3. As the high-molecular liquid crystal, there is used the crystal having the low-molecular liquid-crystal group at the side chain, as shown in Chemical Formula 7.

The solution mixed at the ratio described above is spin coated onto the substrate 61 to be coated under the condition of 500 rpm for 10 seconds, and further under the condition of 3000 rpm for 30 seconds, to form the film 69.

Figure 27:
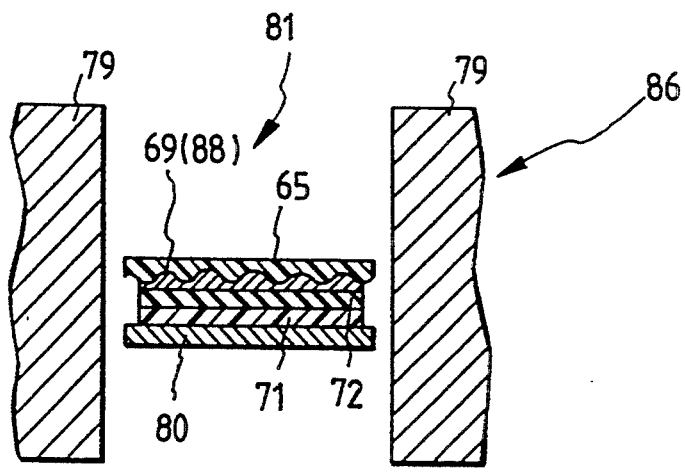
FIG. 27 is a cross-sectional view representing the process wherein the inner film is formed in Example 24.
Figure 28:
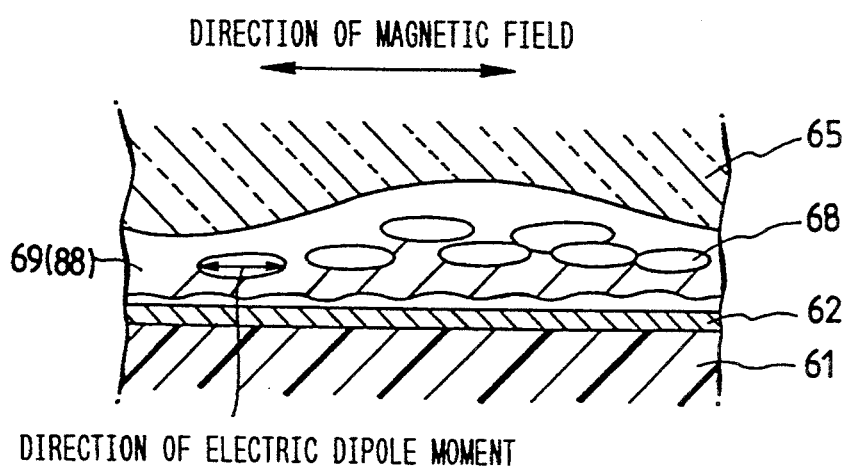
FIG. 28 is a schematic view representing the manner as to how to subject the low-molecular liquid crystal group of high-molecular liquid crystal to the orientation process in Example 24.

3. After the formation of the film, the substrate 61 is set in stamping apparatus 86 with the mechanism of generating magnetic-field, as is shown in FIG. 27. While heating the substrate 61 with quartz heater 80 to 150° C. to 250° C., the film is pressed with stamper 65 to transfer the irregular form on the surface of the film, concurrently with the orientation process of the low-molecular liquid crystal group of high-molecular liquid crystal in the film, with magnetic field 81 of $10^3$ to $10^5$ gauss for 60 minutes. The stamper 65 is used in order that irregularity of a sin wave form with a smaller pitch is formed in one direction and bilateral asymmetric irregularity is formed with a larger pitch in a direction crossing the above direction.

The orientation process will now be explained in details. The high-molecular liquid crystal to be used as the inner film 69 of the present Example comprises the compound of Chemical Formula 7. In case that the crystal is considered from the respect of molecular levels, the cyano group to which is bonded the phenyl group at the side chain has a larger electronegativity, so the electron is pulled toward the cyano group. Therefore, the electric dipole moment of the low-molecular,-liquid crystal group 68 at the side chain thereof gets parallel to the molecular axis. When the high-molecular liquid crystal of Chemical Formula 7 is subjected to the orientation process, by applying magnetic field 81 parallel to substrate 61, the low-molecular liquid crystal group 68 of the high-molecular liquid crystal can be oriented in a predetermined direction.

4. By decreasing the temperature in the manner such that the orientation status of the high-molecular liquid crystal of the film is not disturbed, the film is cured into inner film 69. Annealing is preferable.
5. The substrate 61 produced by the process described above is combined with the substrate 92 having the function of orientation with sealing agent 64, while maintaining a certain interval, and displaying liquid crystal 71 is then injected between the substrates.

According to the production method of the liquid crystal of the present Example, a film having only layer 88 comprising high-molecular liquid crystal is formed on the surface of the substrate 61, to transfer the irregular form onto the surface of the film by pressing the film with a stamper 65 having irregular form on the surface thereof under heating, simultaneously with the application of magnetic field 81, for the orientation process of the high-molecular liquid crystal. Subsequently, the orientation state is maintained for curing the high-molecular liquid crystal, so that the irregular form of the surface of the stamper 65 is transferred onto the surface of the film to impart the orientation function to the film and to concurrently orient the low-molecular liquid crystal group 68 of the high-molecular liquid crystal. Thus, the film can obtain the function of optical film.

In accordance with the production method of the present Example, substrate 61 is set to stamping apparatus 86 with the mechanism for generating magnetic-field, based on the end face thereof, and the orientation axis can be determined by effecting stamping in such state. Alternatively, magnetic field is applied simultaneously for orientation process, so that the optical axis can be determined based on the end face of the substrate 61, consequently. Thus, both of the orientation axis and the optical axis can be determined on the basis of the end surface of the substrate 61, so that the variation in the direction of the optical axis to the orientation axis gets smaller in the liquid crystal device produced by the present production method.

In the present Example, the orientation process of the high-molecular liquid crystal composing the film is carried out by using magnetic field 81, but the orientation process may be carried out with electric field satisfactorily. The condition of the electric field is preferably $10^3$ to $10^5$ V/cm.

EXAMPLE 25

Figure 29:
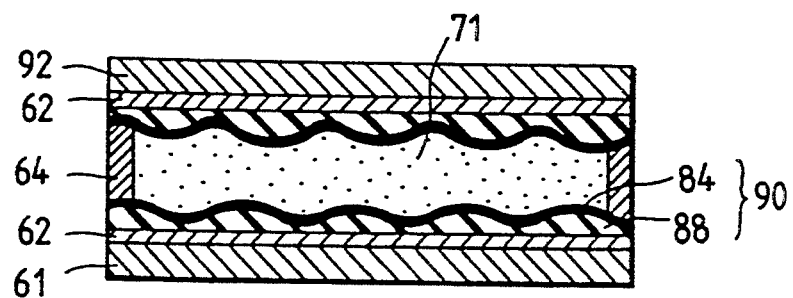
FIG. 29 is a cross-sectional view representing the liquid crystal device of Example 25.
Figure 30:
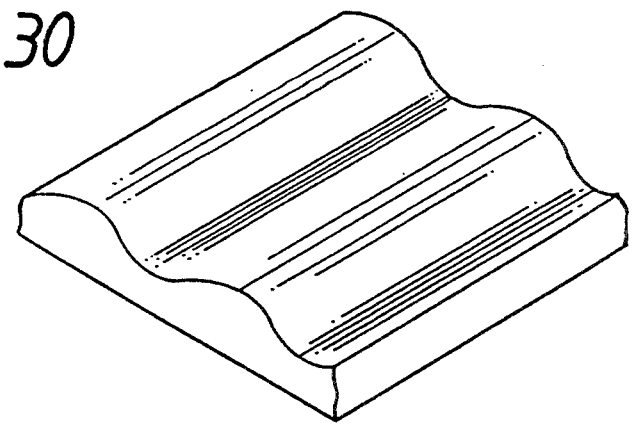
FIG. 30 is a perspective view representing the form of the surface of the inner film of the liquid crystal device of Example 27.

FIG. 29 represents the liquid crystal device of the present Example, and the identical compositional portions to those in the Example described above are marked with the same symbols for schematic explanation.

In this liquid crystal device, there is formed inner film 90 onto the substrate 61 comprising glass. The inner film 90 is formed by using layer 88 comprising high-molecular liquid crystal and protective layer 84 coated thereon.

The layer 88 comprising transparent electrode 62 and high-molecular liquid crystal is formed in the same manner as in Example 23. The protective layer 84 is formed from materials used conventionally as orientation film.

In the liquid crystal device of this Example, the same operational effect can be obtained as in the liquid crystal device of Example 23. Additionally, protective film 84 is formed onto the film 88 comprising high-molecular liquid crystal. Thus, the protective film 49 can prevent the flow of the uncured components of the layer 88 comprising the high-molecular liquid crystal into displaying liquid crystal layer 71. Therefore, the present liquid crystal device can produce the effect such that the property of the layer 88 comprising the high-molecular liquid crystal can be maintained for a long period of time.

EXAMPLE 26

The production method of liquid crystal device having the structure explained in the Example 25 will now be explained. In order to produce the liquid crystal device, layer 88 comprising high-molecular liquid crystal is formed on the substrate 61 formed with transparent electrode 62. The material of the layer 88 comprising high-molecular liquid crystal and the method for fabricating the crystal are the same as in Example 24. Subsequently, a material used conventionally as orientation film is coated onto the layer 88 comprising high-molecular liquid crystal described above so that irregular form may be transferred onto the surface thereof, whereby inner film 90 comprising the layer 88 comprising high-molecular liquid crystal and protective layer 84 is formed.

The substrate 61 thus formed is fabricated in the same manner as in Example 24, to form liquid crystal device.

In the liquid crystal device of the present Example, the same operational effect was obtained as in the production method of Example 24.

EXAMPLE 27

The liquid crystal device of the present Example is different from the liquid crystal device of Example 23 in that the irregular form formed on the surface of the inner film 69 comprising only layer 88 comprising high-molecular liquid crystal with a bicolored pigment added is formed only in one direction, and different in terms of the material used for the inner film 69.

In the present Example, those shown in, the following were used as the high-molecular liquid crystal composing the inner film 69.

Chemical Formula 8

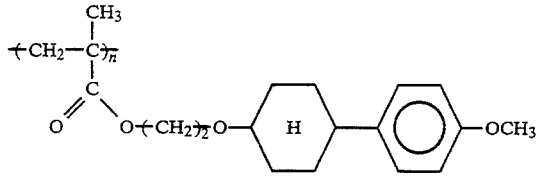

8

Figure 31:
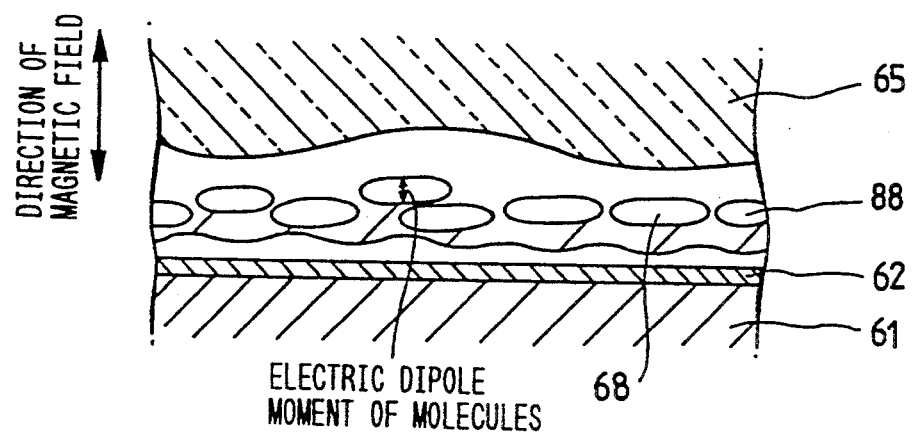
FIG. 31 is a schematic view representing the manner as to how to subject the low-molecular liquid crystal group of high-molecular liquid crystal to the orientation process in Example 27.
Figure 32:
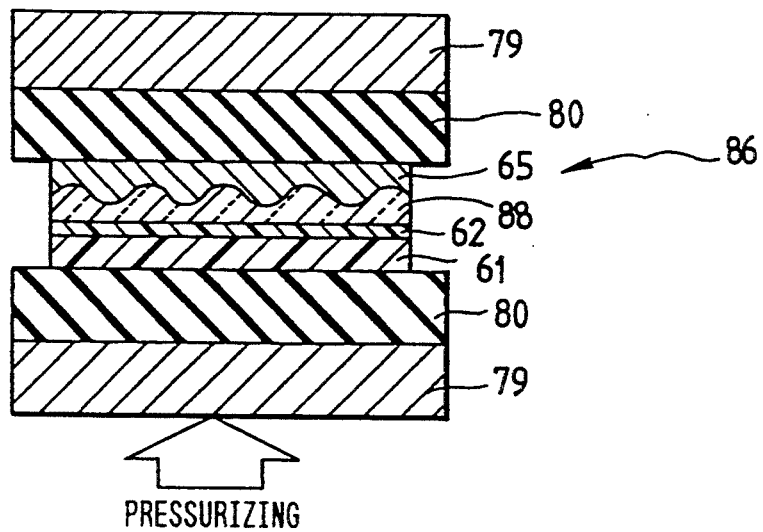
FIG. 32 is a cross-sectional view representing the form of the surface of the inner film of the liquid crystal device of Example 27.

The orientation process of high-molecular liquid crystal will now be explained in details. The high-molecular liquid crystal used as the material of the inner film 69 of the present Example is composed of Chemical Formula 8. If the liquid crystal is considered from the respect of molecular levels, the group bonded to the phenyl group at the side chain does not have electronegativity so the electrons of the phenyl group does not have any place to flow in. Therefore, the electric dipole moment of the low-molecular liquid crystal group 68 at the side chain gets vertical to the molecular axis. The high-molecular liquid crystal of Chemical Formula 8 is subjected to orientation process, by applying magnetic field vertically to the substrate 61, as is shown in FIG. 31, whereby the low-molecular liquid crystal group 68 can be oriented in a predetermined direction.

That is, after the coating of high-molecular liquid crystal is coated in the same manner as in Example 24, layer 88 comprising high-molecular liquid crystal is pressed with a stamper 65 with the irregularity formed, in one direction, of sin wave form with a smaller pitch, to transfer the irregularity of the stamper and to simultaneously generate magnetic field 81 of $10^3$ to $10^5$ with a permanent magnet 79, while heating the substrate 61 with a quartz heater 80° to 150° to 250° C., for the orientation process of the low-molecular liquid crystal group of high-molecular liquid crystal for 60 minutes.

In the liquid crystal device of the present Example, the same operational effect as in Example 24 is obtained.

The orientation process of the high-molecular liquid crystal as the inner film 69 may satisfactorily be subjected to orientation process with electric field. The condition of electric field is preferably $10^3$ to $10^5$ V/cm.

EXAMPLE 28

Figure 33:
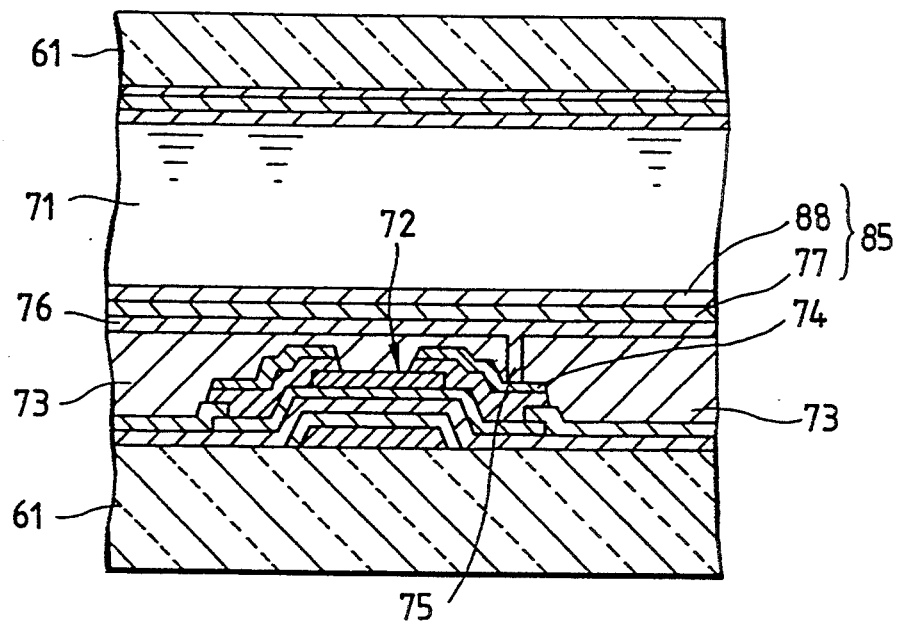
FIG. 33 is a cross-sectional view representing the liquid crystal device of Example 28.

FIG. 33 is a cross-sectional view of the liquid crystal device of the present Example. The different point of the liquid crystal device from that of Example 23 is that thin-film transistor 72 is arranged and that pixel electrode 76 is arranged above the thin-film transistor 72.

In the liquid crystal device of the present Example, the thin-film transistor 72 is formed onto the substrate 61. Leveling layer 73 is formed thereon. Pixel electrode 76 is formed above the leveling layer. The pixel electrode 76 is connected to the source electrode 74 of the thin-film transistor 72, through contact hole 75 on the leveling layer 73. On the pixel electrode 76 described above is formed the inner film 85. The inner film 85 is composed of base layer 77 and layer 88 comprising high-molecular liquid crystal positioned thereon.

In the liquid crystal device of the present Example, the advantages shown below are also obtained besides the same advantages as in Example 23.

Figure 34:
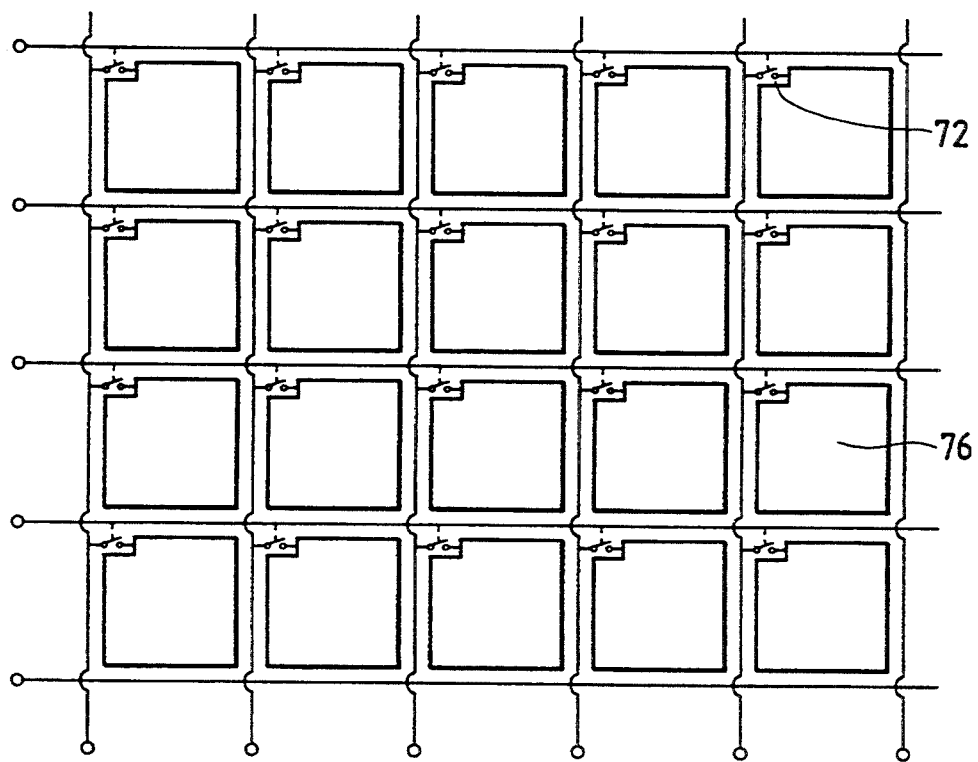
FIG. 34 is a schematic view representing the liquid crystal device provided with a conventional transistor.

In conventional thin-film transistor liquid crystal devices, thin-film transistor 72 and pixel electrode 76 are arranged at the same height as shown in FIG. 34. Therefore, the higher the density is, the smaller the area of the pixel electrode 76 becomes, causing rough picture plane. In the liquid crystal device of the present Example, the pixel electrode 76 is arranged above the thin-film transistor 72, so there is no need to decrease the pixel area occupied in the picture plane even if the pixel number is increased. Thus, the deterioration of the displaying quality can be avoided.

EXAMPLE 29

Figure 35:
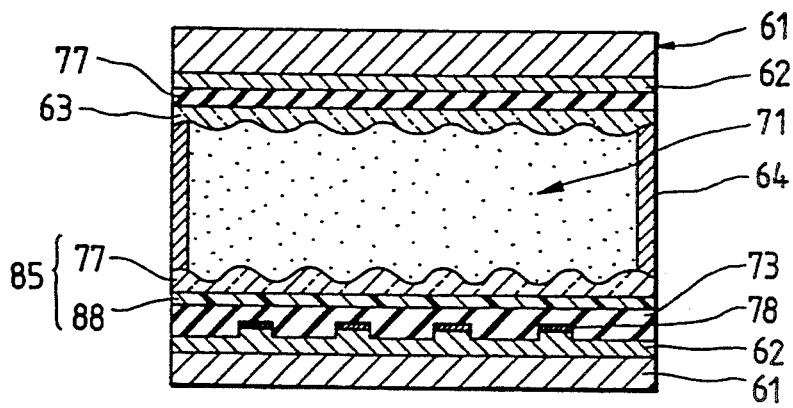
FIG. 35 is a cross-sectional view representing the color liquid crystal device of Example 29.
Figure 36:
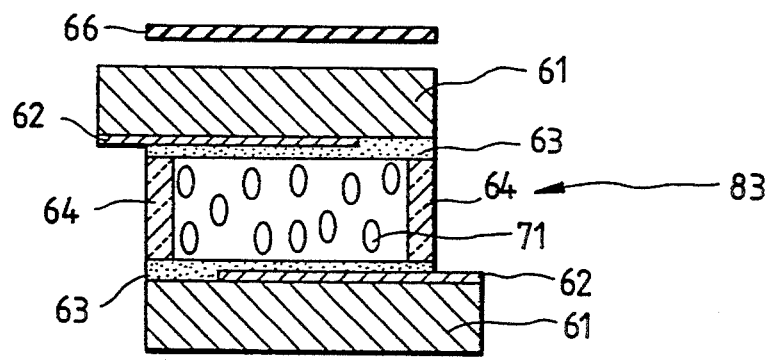
FIG. 36 is a cross-sectional view representing a conventional liquid crystal device.

FIG. 35 is a cross-sectional view of the liquid crystal device of the present Example. The different point of the liquid crystal device from that of Example 23 is that coloring layer 78 is arranged on transparent electrode 62.

In the liquid crystal device of the present Example, transparent electrode 62 is formed onto the substrate 61. Coloring layer 78 is formed thereon. Leveling layer 73 is formed above the coloring layer 78. Inner film 85 is further formed on the leveling layer 73. The inner film 85 comprises layer 88 comprising high-molecular liquid crystal and base layer 77. The same irregularity as in the inner film 69 of Example 23 is formed on the surface of the base layer 77.

In the liquid crystal device of the present Example, the same operational effect as in Example 23 was obtained.

EXAMPLE 30

Figure 37:
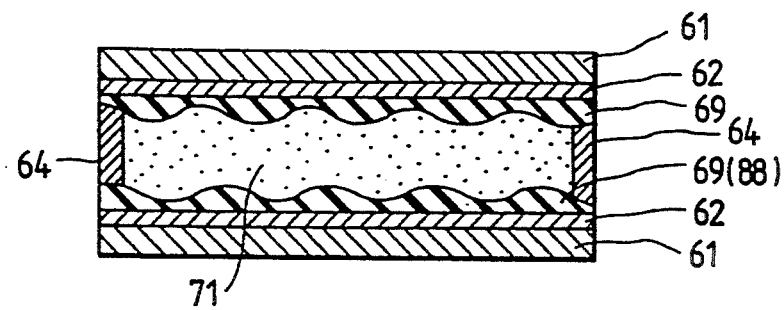
FIG. 37 is a cross-sectional view representing the liquid crystal device of Example 30.
Figure 38:
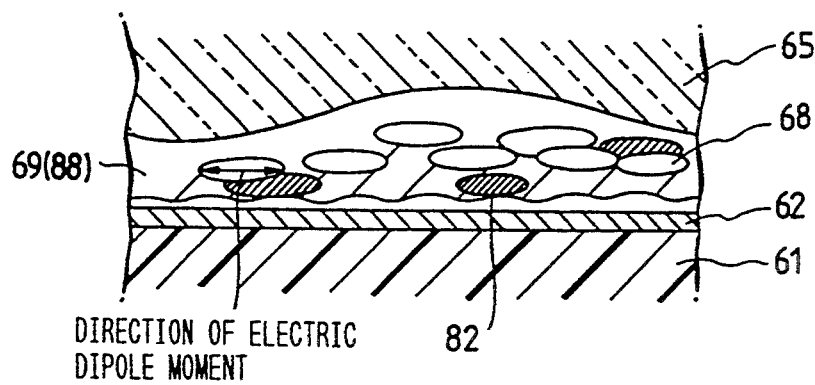
FIG. 38 is a schematic view representing the manner as to how to subject the low-molecular liquid crystal group of high-molecular liquid crystal with a bicolored pigment added in Example 31.

FIG. 37 represents the liquid crystal device of the present Example. The different point of the present Example from that of Example 23 is that layer 88 comprising high-molecular liquid crystal with a bicolored pigment added is used and that the substrates of the present Example are used on and below.

On transparent electrode 62, there is formed inner film 69 composed of layer 88 only comprising high-molecular liquid crystal with a bicolored pigment added. The inner film 69 is formed by using a mixed solution of tetrafluoroisopropyl alcohol, high-molecular liquid crystal and a bicolored pigment at a ratio of 100:3.0:0.06. Iodine is used in the bicolored pigment, and the chemical compound having the low-molecular liquid crystal group at the side chain thereof, as shown below, is used as the high-molecular liquid crystal.

Chemical Formula 9

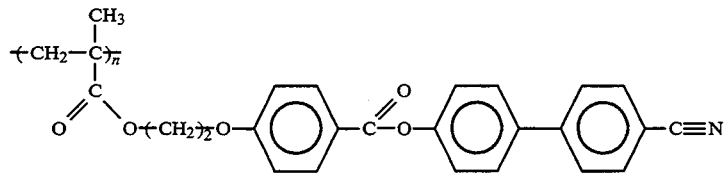

8

The low-molecular liquid crystal group 68 of the high-molecular liquid crystal composing the inner film 69 is oriented in a predetermined direction, and the bicolored pigment is oriented in the same direction as the high-molecular liquid crystal components. Due to the orientation of the bicolored pigment in a predetermined direction, the inner film 69 exhibits polarization function.

As is shown in FIG. 37, two substrates 61 formed in the above manner are adhered together with sealing agent 64. Displaying liquid crystal 71 is injected into the cell thus prepared.

Because the inner surface is of irregular form and the inner film 69 containing only layer 88 comprising high-molecular liquid crystal is arranged on the substrate 61 in the liquid crystal device of the present Example, the bicolored pigment is oriented in a predetermined direction if the low-molecular liquid crystal group of high-molecular liquid crystal is oriented in an appropriate direction, whereby the inner film 69 is provided with polarization function. Additionally, the irregular form is arranged onto the surface of the inner film 69, so that the inner film 69 can be provided with orientation function.

In the liquid crystal device of the present Example, the irregular form can be formed onto the inner film 69 on the basis of the end face of the substrate 61, and the low-molecular liquid crystal group 68 of the high-molecular liquid crystal can further be subjected to orientation process on the basis of the end face of the same substrate 61. That is, both of the polarization axis and the orientation axis can be determined using the same criteria of the end face of the substrate 61.

In the liquid crystal device of the present Example, accordingly, the direction of polarization axis to the orientation axis can be adjusted more accurately and more readily, so the displaying quality of liquid crystal device can be improved.

EXAMPLE 31

The liquid crystal device having the composition explained in the Example 30 described above can be produced by the processes from 1 to 5 as in the same manner of Example 24.

1. Transparent electrode comprising ITO and the like is formed on substrate 61 by photolithography.
2. High-molecular liquid crystal is coated onto the substrate to form inner film 69 having only layer 88 comprising high-molecular liquid crystal. The film is formed on the substrate 61 to be coated, by spin-coating under the condition of 500 rpm for 10 seconds and further under the condition of 3000 rpm for 30 seconds.
3. After the formation of the film, the substrate 61 is set in stamping apparatus 86 with the mechanism of generating magnetic-field, as is shown in FIG. 27. While heating the substrate 61 with quartz heater 80° to 150° C. to 250° C., the film is pressed with stamper 65 to transfer the irregular form on the surface of the film, concurrently effecting the orientation process of the low-molecular liquid crystal group of high-molecular liquid crystal in the film with magnetic field 81 of $10^3$ to $10^5$ gauss, generated by permanent magnet 79, for 60 minutes. The stamper 65 is used in order that irregularity of a sin wave form with a smaller pitch is formed in one direction and bilateral asymmetric irregularity is formed with a larger pitch is formed in a direction crossing the above direction.

The orientation process will now be explained in details. The high-molecular liquid crystal to be used as a material for the film of the present Example is the same as shown in Example 20. In case that the crystal is considered from molecular levels, the cyano group to which is bonded the phenyl group at the side chain has a larger electronegativity, so the electrons of the phenyl group is pulled toward the cyano group. Therefore, the electric dipole moment of the low-molecular liquid crystal group 68 at the side chain thereof gets parallel to the molecular axis. When the high-molecular liquid crystal is subjected to the orientation process by applying magnetic field 81 parallel to substrate 61, the low-molecular liquid crystal group 68 of the high-molecular liquid crystal can be oriented in a predetermined direction.

4. By decreasing the temperature in the manner such that the orientation status of the high-molecular liquid crystal of the film is not disturbed, the film is cured into inner film 69. Annealing is preferable.
5. The two substrate 61 produced by the process described above are combined together with sealing agent 64, while maintaining a certain interval, and displaying liquid crystal 71 is injected therein.

According to the production method of the liquid crystal device of the present Example, a film having only layer 88 comprising high-molecular liquid crystal with a bicolored pigment 82 added is formed on the surface of the substrate 61, to transfer the irregular form onto the surface of the film by pressing the film with a stamper 65 having irregular form on the surface thereof under heating, simultaneously with the application of magnetic field 81 for the orientation process of the high-molecular liquid crystal. Subsequently, the orientation state is maintained for curing the high-molecular liquid crystal, so that the irregular form of the surface of the stamper 65 is transferred onto the surface of the film to impart the orientation function to the film and to concurrently orient the low-molecular liquid crystal group 68 of the high-molecular liquid crystal, simultaneously involving the alignment of the bicolored pigment 82 in the same direction. Thus, the film can obtain the function of optical film.

In accordance with the production method of liquid crystal device of the present Example, substrate 61 is set in stamping apparatus 86 with the mechanism for generating magnetic-field, based on the end face thereof, and the orientation axis can be determined by effecting stamping in such state.

Thus, both of the orientation axis and the optical axis can be determined on the basis of the end face of the substrate 61, so that the variation in the direction of the optical axis to the orientation axis gets smaller in the liquid crystal device produced by the production method of the present Example.

In the present Example, the orientation process of the high-molecular liquid crystal composing the film is carried out by using magnetic field 81, but the orientation process may satisfactorily be carried out with electric field. The condition of the electric field is preferably $10^3$ to $10^5$ V/cm.

EXAMPLE 32

Figure 39:
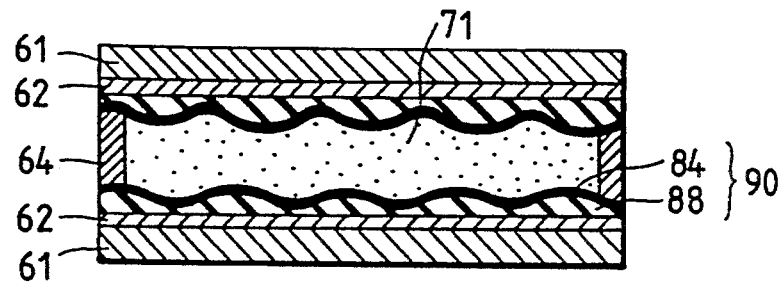
FIG. 39 is a cross-sectional view representing the liquid crystal device of Example 32.

FIG. 39 represents the liquid crystal device of the present Example, and the identical compositional parts to those in the Example 31 described above are marked with the same symbols for schematic explanation.

The different point of the present Example from that of Example 25 is that layer 88 comprising high-molecular liquid crystal with a bicolored pigment added is used and that the substrates of the present Example are used on and below, as in Example 30.

In the liquid crystal device of the present Example, there is formed inner film 90 on the substrate 61 comprising glass. The inner film 90 is formed by using layer 88 comprising high-molecular liquid crystal with a bicolored pigment added and protective layer 84 to be coated thereon.

The layer 88 comprising transparent electrode 62 and high-molecular liquid crystal with a bicolored pigment added is formed as in Example 30. The protective layer 84 is formed with a material conventionally used as orientation film.

In the liquid crystal device of the present Example, the same operational effect can be obtained as in the liquid crystal device of Example 30. In addition, protective layer 84 is coated onto the layer 88 comprising the high-molecular liquid crystal with the bicolored pigment added. Therefore, the protective layer 84 can prevent the flow of the bicolored pigment 82 from the layer 88 comprising the high-molecular liquid crystal with the bicolored pigment 82 added into displaying liquid crystal layer 71. Thus, the present liquid crystal device can produce the effect such that the property of the layer 88 comprising the high-molecular liquid crystal with the bicolored pigment added 72 can be maintained for a long period of time.

EXAMPLE 33

The production method of the liquid crystal device having the composition explained in the Example 32 described above, will now be explained hereinbelow. In order to produce the liquid crystal device, a material for fabricating layer 88 comprising high-molecular liquid crystal with a bicolored pigment 82 added on substrate 61 formed with transparent electrode 62 and the method for producing the layer are the same as in Example 31. The material used conventionally as orientation film is subsequently coated so as to transfer irregular form. Thus, there is formed the inner film 90 comprising the layer 88 comprising the high-molecular liquid crystal with the bicolored pigment added and the protective layer 84.

The substrate 61 thus formed is fabricated in the same manner as in Example 31, to form liquid crystal device.

In the liquid crystal device of the present Example, the same operational effect is obtained as in the production method of Example 31.

EXAMPLE 34

The liquid crystal device of the present Example is different from the liquid crystal device of Example 30 in that the irregular form which is formed on the surface of the inner film 69 comprising only layer 88 comprising high-molecular liquid crystal with a bicolored pigment added is formed in only one direction, and is different in terms of the material used for the inner film 69.

In the present Example, as the bicolored pigment composing the inner film 69, there is used the pigment produced by mixing a yellow pigment G232 (manufactured by Nippon Kanko Kabushiki Kaisha), a red pigment LSR405 (manufactured by Mitsubishi Kasei Kabushiki Kaisha), and a blue pigment LSB (manufactured by Mitsubishi Kasei Kabushiki Kaisha) at a ratio of 1:1:1. As the high-molecular liquid crystal, the crystal shown in the following is used.

Chemical Formula 10

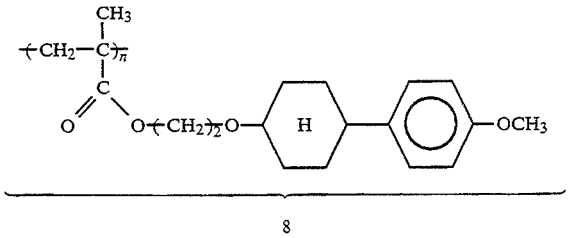

8

Figure 40:
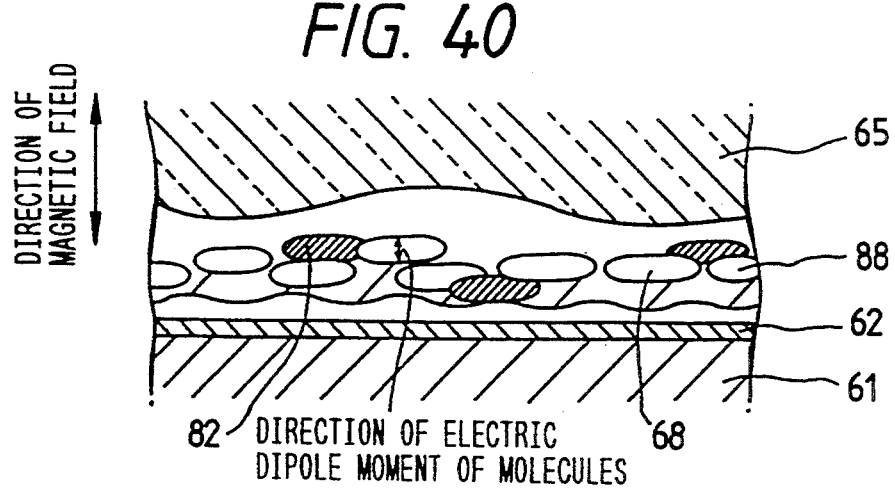
FIG. 40 is a schematic view representing the manner as to how to subject the low-molecular liquid crystal group of high-molecular liquid crystal with a bicolored pigment added in Example 34.

The orientation process of the high-molecular liquid crystal will now be explained. When the high-molecular liquid crystal used as the material of the inner film 69 of the Example is considered from the respect of molecular levels, the group bonded to the phenyl group at the side chain does not have a larger electronegativity, so the electrons do not have a place to flow in. Therefore, the electric dipole moment of the low-molecular liquid crystal group 68 at the side chain gets vertical to the molecular axis. The high-molecular liquid crystal is subjected to orientation process by applying magnetic field vertically to the substrate 61 as is shown in FIG. 40, so that the low-molecular liquid crystal group 68 can be oriented in a predetermined direction.

After the high-molecular liquid crystal with a bicolored pigment added is coated as is shown in Example 31, layer 88 comprising high-molecular liquid crystal is pressed with a stamper 65 with the irregularity formed in one direction of sin wave form with a smaller pitch, to transfer the irregularity of the stamper and to simultaneously generate magnetic field 71 of $10^3$ to $10^5$ with permanent magnet 79, while heating the substrate 61 with a quartz heater 80° to 150° to 250° C., for the orientation process of the low-molecular liquid crystal group 68 of high-molecular liquid crystal for 60 minutes.

In the liquid crystal device of the present Example, the same operational effect as in Example 31 is obtained.

In the present Example, instead of the bicolored pigment used in the inner film 69, there may satisfactorily be used the pigment produced by mixing a yellow pigment G232 (manufactured by Nippon Kanko Kabushiki Kaisha), a red pigment LSR405 (manufactured by Mitsubishi Kasei Kabushiki Kaisha), and a blue pigment LSB (manufactured by Mitsubishi Kasei Kabushiki Kaisha) at a ratio of 0.5:1:0.5.

The orientation process of high-molecular liquid crystal of inner film 69 may satisfactorily be subjected to the orientation process with electric field. The condition of electric field may then be $10^3$ to $10^5$ V/cm, preferably.

EXAMPLE 35

FIG. 33 represents a cross-sectional view of the liquid crystal device of the present Example. The different point of the liquid crystal device from that of Example 30 is that thin-film transistor 72 is arranged and that pixel electrode 76 is arranged above the thin-film transistor 72.

In the liquid crystal device of the present Example, the thin-film transistor 72 is formed onto the substrate 61. Leveling layer 73 is formed thereon. Pixel electrode 76 is formed above the leveling layer 73. The pixel electrode 76 is connected to the source electrode 74 of the thin-film transistor 72, through contact hole 75 on the leveling layer 73. On the pixel electrode 76 described above is formed the inner film 85. The inner film 85 comprises base layer 77 and layer 88 comprising high-molecular liquid crystal.

In the liquid crystal device of the present Example, the advantages shown below are also obtained besides the same advantages as in Example 30.

In conventional thin-film transistor liquid crystal devices, thin-film transistor 72 and pixel electrode 76 are arranged at the same height as shown in FIG. 34. Therefore, the higher the density is, the smaller the area of the pixel electrode 76 is, causing rough picture plane. In the liquid crystal device of the present Example, the pixel electrode 76 is arranged above the thin-film transistor 72, so there is no need to decrease the pixel area occupied in the picture plane even if the pixel number is increased. Thus, the deterioration of the displaying quality can be avoided.

EXAMPLE 36

Figure 41:
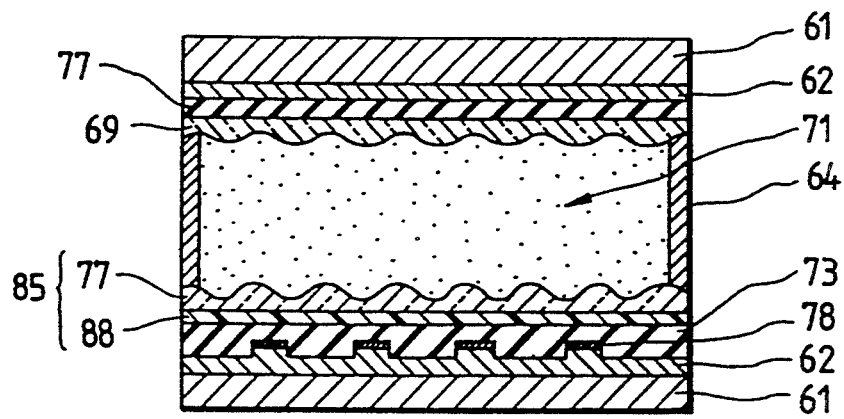
FIG. 41 is a cross-sectional view representing the color liquid crystal displaying device of Example 36.

FIG. 41 represents a cross-sectional view of the liquid crystal device of the present Example. The different point of the liquid crystal device from that of Example 30 is that coloring layer 78 is arranged on transparent electrode 62.

In the liquid crystal device of the present Example, transparent electrode 62 is formed onto the substrate 61. Coloring layer 78 is formed thereon. Above the coloring layer 78 is formed leveling layer 73, and inner film 85 is formed on the leveling layer 73. The inner film 85 is composed of high-molecular liquid crystal with a bicolored pigment added and base layer 77. Furthermore, the same irregularity as in the inner film 69 of Example 30 is formed on the surface of the base layer 77.

In the liquid crystal device of the present Example, the same operational effect was obtained as in Example 30.

The orientation film of the present invention has the irregular form repeated in a first direction and irregular form repeated in a second direction crossing the first direction with a pitch longer than the pitch of the irregular form repeated in the first direction, wherein the pretilt angle is made larger and the order parameter is increased. Therefore, the orientation property is intense and thus, the liquid crystal displaying device using the orientation film of the present invention does not readily cause disclination.

Furthermore, by making the cross-sectional form of the convex portion of the irregular form repeated with a longer pitch in the second direction, the effect gets more remarkable.

According to the production method of the orientation film of the present invention, there do not involve the problems of the generation of dust or static electricity and too much production cost. The irregularity can be formed in the first direction and the second direction.

According to the method for using nickel stamp, in particular, the irregularity can be transferred with more reproducibility and more clearly.

As has been explained above, the orientation film of the liquid crystal of the present invention has the film comprising a photosensitive resin with the surface thereof containing irregular form on a substrate body. The production method of the orientation film of the liquid crystal of the present invention comprises forming the film comprising photosensitive resin on the surface of the substrate body, and photosensitizing the film of the photosensitive resin with a predetermined pattern for subsequent development, whereby the irregular form having orientation function is formed on the surface thereof.

According to such orientation film of liquid crystal and the method for producing the same, a predetermined pattern is formed on the surface of the film comprising photosensitive resin, and therefore, there is no cause of generating dust or static electricity. Thus, excellent substrates can be produced. According to the present forming method, the irregular form can be formed by lithography to be used at the production of semiconductors. Therefore, substrates can be formed at lower cost and with good reproducibility.

In the LCD of the present invention, base layer having irregular form is formed, and a film of high-molecular liquid crystal is further formed thereon. When the film of high-molecular liquid crystal formed on the base layer is heated to the level of isotropic fluid and annealing is gradually effected down to nematic phase, the low-molecular liquid crystal group component of the film of high-molecular liquid crystal is oriented along the irregular form of the base layer. Because the low-molecular liquid crystal group component of the film of high-molecular liquid crystal is oriented in one direction, the light transmitting through the film can cause phase difference. The phase difference can be controlled by the film thickness of the film of the high-molecular liquid crystal.

In the LCD of the present invention, the function as the phase-difference plate arranged on STN-type LCD for the objective to eliminate coloring, can be imparted to the film of high-molecular liquid crystal, so that there is no need to arrange phase-difference plate to substrates.

According to the LCD of the present invention, productivity can be improved.

As has been described above, a fluid containing high-molecular liquid crystal is coated on the surface of substrates, whereby the film of high-molecular liquid crystal can be formed. Thus, there does not occur slight folding at the mounting of phase-difference plate, which has conventionally been a problem. Thus, there can be avoided the problem of non-uniformity in the difference in index of refraction between normal light and abnormal light due to the folding.

The displaying quality of the LCD of the present invention is improved.

The liquid crystal device explained above, contains layer comprising high-molecular liquid crystal wherein the inner film with the inner surface of irregular form is mounted on a substrate, and the irregular form of the inner film then functions as the orientation film where the displaying liquid crystal molecules infiltrate for orientation. By the orientation process of the high-molecular liquid crystal in the layer comprising the high-molecular liquid crystal composing the inner film, the low-molecular liquid crystal group of the high-molecular liquid crystal can be oriented to give the inner film the function of optical film. In such manner, the inner film formed on the inner face of the substrate can get both the orientation function and the function as optical film.

Thus, in the liquid crystal device the orientation axis and the optical axis of optical film can be formed employing the end face of the substrate as the common criteria. Therefore, the adjustment of the two axes can be carried out accurately, so that the liquid crystal device of more excellent displaying quality can be achieved.

According to the production method of the liquid crystal device, a film containing the layer comprising the high-molecular liquid crystal is formed onto a substrate, and the film is pressed under heating to transfer the irregular form onto the surface of the film, along with simultaneous application of magnetic field or electric field or electric field to subject the high-molecular liquid crystal to orientation process. Subsequently without damaging the orientation state, the high-molecular liquid crystal can be cured. Based on the criteria of the end face of the substrate, irregular form is formed on the film and simultaneously high-molecular liquid crystal can be oriented.

According to the production method of liquid crystal device, therefore, the direction of orientation axis and the direction of optical axis can be determined employing the same criteria of the end face of a substrate, so that the direction of the optical axis can be determined for each substrate without variation, so liquid crystal devices with less variation in displaying quality can be produced.

Additionally, with no contamination of the surface of the film having orientation function, the yield is improved remarkably.

What is claimed is:

1. A method for producing the orientating film of liquid crystal comprising:
   preparing a first molding member having irregular form repeated in a first direction;
   preparing a second molding member having irregular form repeated in a second direction crossing the first direction with a longer pitch than the pitch of the irregular form repeated in the first direction;
   pressing the first molding member or second member on the resin-formed surface of a substrate to transfer the irregular form of the first or the second molding member on the surface of the substrate; and subsequently
   pressing the second or the first molding member to transfer the irregular form of the second or the first molding member, thereby sequentially transferring the irregular form of the first and the second molding member on the surface of the substrate.

2. The method of producing the orientation film of liquid crystal according to claim 1, characterized in that the cross-sectional form of each concave portion repeated with a longer pitch in the second direction formed on the molding member is bilaterally asymmetric.

3. A method for producing a liquid crystal device, comprising steps of:
   forming an orientation film on a substrate, said orientation film comprising a high-molecular liquid crystal;
   heating the substrate;
   pressing the orientation film with a stamper having an irregular surface, thereby transferring the irregular shape of the stamper onto the surface of the orientation film,
   applying one of a magnetic field and an electric field to produce an orientation of the orientation film, and subsequently
   curing the orientation film by maintaining contact between the stamper and the orientation film while continuing to heat the substrate.

4. A orientation film of a liquid crystal, said orientation film being formed on a planar substrate, said orientation film comprising:
   a plurality of parallel, continuous convex ridges, each adjacent pair of said plurality of ridges being separated by a continuous groove;
   wherein each of said plurality of ridges has an irregular, asymmetric repeated form in a longitudinal direction and a width, the repeated form in the longitudinal direction being longer than the width; and
   wherein said orientation film is entirely defined by said plurality of ridges and associated grooves such that all surfaces of the orientation film are curved with respect to said planar substrate.

5. An orientation film of liquid crystal as in claim 4, wherein said film comprises a photosensitive resin formed on the substrate, said photosensitive resin having irregular form on the surface thereof.

6. A orientation film of liquid crystal according to claim 4, wherein said film comprises a photosensitive polyimide resin formed on the substrate, said polyimide resin having irregular form on the surface thereof.

7. A liquid crystal device having a pair of planar substrates opposing each other at their major surfaces, and a layer of display liquid crystal sandwiched between said substrates, said liquid crystal device comprising:
   a base layer formed on each of the inner opposing surfaces of said planar substrates and having a plurality of parallel continuous convex ridges, each adjacent pair of said plurality of ridges being separated by a continuous groove, wherein each of said plurality of ridges has an irregular, asymmetric repeated form in a longitudinal direction and a width, the repeated form in the longitudinal direction being longer than the width, and wherein said orientation film is entirely defined by said plurality of ridges and associated grooves such that all surfaces of the orientation film are curved with respect to said planar substrate, and an orientation film located on said base layer, said orientation film having an irregular form which serves to orient the display liquid crystal and which is similar to that formed on the surface of said base layer.

8. A liquid crystal device having a pair of planar substrates opposing each other at their major surfaces, and a layer of display liquid crystal sandwiched between said substrates, said liquid crystal device comprising:

an orientation film including a plurality of parallel continuous convex ridges, each adjacent pair of said plurality of ridges being separated by a continuous groove;

wherein each of said plurality of ridges has an irregular, asymmetric repeated form in a longitudinal direction and a width, the repeated form in the longitudinal direction being longer than the width; and wherein said orientation film is entirely defined by said plurality of ridges and associated grooves such that all surfaces of the orientation film are curved with respect to said planar substrate.

* * * * *